United States Patent
Goetz et al.

(10) Patent No.: US 11,308,466 B1
(45) Date of Patent: *Apr. 19, 2022

(54) SYSTEMS AND METHODS FOR COMPLETING TRANSACTIONS VIA LOCKABLE BOXES

(71) Applicant: Wells Fargo Bank, N.A., San Francisco, CA (US)

(72) Inventors: Darren M. Goetz, Salinas, CA (US); Miranda C. Hill, Seattle, WA (US); Dennis E. Montenegro, Concord, CA (US); Alicia Y. Moore, San Ramon, CA (US); Susan Symons, Mooresville, NC (US); Timothy R. Ward, Mesa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 16/199,048

(22) Filed: Nov. 23, 2018

Related U.S. Application Data

(63) Continuation of application No. 15/796,217, filed on Oct. 27, 2017, which is a continuation-in-part of application No. 15/466,706, filed on Mar. 22, 2017.

(Continued)

(51) Int. Cl.
*G06Q 20/10* (2012.01)
*G06Q 20/38* (2012.01)
(Continued)

(52) U.S. Cl.
CPC ......... *G06Q 20/108* (2013.01); *G06Q 20/381* (2013.01); *G06Q 20/40* (2013.01); *G07F 19/00* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 5,987,439 A | * | 11/1999 | Gustin | G06Q 20/04 235/379 |
| 7,185,804 B1 | * | 3/2007 | Rozlosnik | G06Q 20/1085 235/379 |

(Continued)

OTHER PUBLICATIONS

"Meg Conlan-Donnelly, Pre-Staging Tech Improves the Speed and Security of Bank Transactions (2015), https://biztechmagazine.com/article/2015/09/pre-staging-tech-improves-speed-and-security-bank-transactions" (Year: 2015).*

(Continued)

*Primary Examiner* — Christopher Bridges
*Assistant Examiner* — Toan Duc Bui
(74) *Attorney, Agent, or Firm* — Foley & Lardner LLP

(57) ABSTRACT

A method performed by a processor of a provider computing system includes allowing an account holder at the provider to initiate a transaction with the provider remotely (e.g., via smartphone, online banking, etc.), by submitting a request for a specified transaction to be picked up in a lockbox at a provider's lockbox location. The pickup and completion of the account holder's requested transaction occurs at a lockbox location that has a plurality of lockboxes. The lockbox allows the account holder to access the facility at the account holder's leisure, both in time and location. The lockbox pickup service alleviates the uncertainty, fluctuating time cost, and inconvenient operating hours by allowing the account holder to request transactions with an easy to use interface resulting in a lockbox to be accordingly prepped so that the account holder can provide the proper authentication information and access the lockbox.

20 Claims, 13 Drawing Sheets

Related U.S. Application Data

(60) Provisional application No. 62/523,116, filed on Jun. 21, 2017, provisional application No. 62/318,054, filed on Apr. 4, 2016.

(51) Int. Cl.
*G07F 19/00* (2006.01)
*G06Q 20/40* (2012.01)
*G06F 3/0482* (2013.01)

(56) References Cited

U.S. PATENT DOCUMENTS

| | | | |
|---|---|---|---|
| 7,545,816 B1 | 6/2009 | Coutts et al. | |
| 8,162,125 B1* | 4/2012 | Csulits | G07D 7/0047 |
| | | | 194/206 |
| 8,577,805 B1* | 11/2013 | Oakes, III | G06Q 20/351 |
| | | | 705/45 |
| RE45,012 E * | 7/2014 | Jones | G06Q 10/06 |
| | | | 340/666 |
| 9,141,876 B1 | 9/2015 | Jones et al. | |
| 9,558,636 B1* | 1/2017 | Burdick | G07F 19/209 |
| 9,822,553 B1* | 11/2017 | Ho | E05B 47/0012 |
| 9,996,999 B2 | 6/2018 | Conrad et al. | |
| 10,354,246 B1 | 7/2019 | Janiga | |
| 10,474,986 B1 | 11/2019 | Phillips et al. | |
| 10,482,420 B1 | 11/2019 | Brooks et al. | |
| 2001/0042024 A1 | 11/2001 | Rogers | |
| 2002/0003163 A1* | 1/2002 | Peebles | G07D 11/14 |
| | | | 235/379 |
| 2002/0161652 A1* | 10/2002 | Paullin | B65D 79/00 |
| | | | 705/22 |
| 2003/0115148 A1* | 6/2003 | Takhar | G06Q 20/382 |
| | | | 705/64 |
| 2007/0096870 A1 | 5/2007 | Fisher | |
| 2008/0301047 A1* | 12/2008 | Fish | G06Q 20/1085 |
| | | | 705/41 |
| 2009/0108988 A1* | 4/2009 | Cleveland | E05C 9/12 |
| | | | 340/5.52 |
| 2010/0066491 A1 | 3/2010 | Bohen et al. | |
| 2011/0191243 A1* | 8/2011 | Allen | G06Q 10/06315 |
| | | | 705/43 |
| 2013/0060708 A1 | 3/2013 | Oskolkov et al. | |
| 2013/0124410 A1 | 5/2013 | Kay et al. | |
| 2013/0151267 A1* | 6/2013 | Mehdizadeh | G16H 20/13 |
| | | | 705/2 |
| 2013/0159121 A1 | 6/2013 | May et al. | |
| 2013/0261793 A1* | 10/2013 | Geller | G06Q 30/06 |
| | | | 700/234 |
| 2013/0307670 A1* | 11/2013 | Ramaci | G06F 21/32 |
| | | | 340/5.82 |
| 2014/0144976 A1* | 5/2014 | Angus | G07D 7/003 |
| | | | 235/375 |
| 2014/0172703 A1* | 6/2014 | Black | G06Q 20/40145 |
| | | | 705/43 |
| 2014/0351127 A1 | 11/2014 | McMullan et al. | |
| 2015/0269433 A1 | 9/2015 | Amtrup et al. | |
| 2016/0005284 A1* | 1/2016 | Batra | G08B 25/10 |
| | | | 340/572.1 |
| 2016/0014552 A1* | 1/2016 | Hanson | G06Q 20/3224 |
| | | | 455/456.3 |
| 2016/0048813 A1* | 2/2016 | Mauller | G06Q 40/12 |
| | | | 705/30 |
| 2016/0055694 A1* | 2/2016 | Saeedi | G07C 9/27 |
| | | | 340/5.52 |
| 2016/0167912 A1* | 6/2016 | Jeong | E05G 1/026 |
| | | | 271/3.14 |
| 2016/0267438 A1* | 9/2016 | Sobol | G06Q 10/1095 |
| 2016/0277382 A1 | 9/2016 | Streuter et al. | |
| 2017/0178130 A1 | 6/2017 | Coburn | |
| 2018/0247481 A1* | 8/2018 | Gilbertson | G06Q 20/18 |
| 2018/0350170 A1 | 12/2018 | Wang et al. | |
| 2021/0027295 A1 | 1/2021 | Raquepaw et al. | |

OTHER PUBLICATIONS

Singapore Application No. 10201503531V.
Wikipedia, "change-making problem" https://web.archive.org/web/20150423104953/https://en.wikipedia.org/wiki/Change-making_problem, (Year: 2015).
"Luke Stark, Matt Tierney, Lockbox: mobility, privacy and values in cloud storages (2013) Springer Science Business Media Dordrecht, 2014 edition, 2-3" (Year: 2013).

* cited by examiner

SYSTEMS AND METHODS FOR COMPLETING TRANSACTIONS VIA LOCKABLE BOXES

CROSS REFERENCE TO RELATED APPLICATION

This application is a continuation of U.S. patent application Ser. No. 15/796,217 entitled "SYSTEMS AND METHODS FOR COMPLETING TRANSACTIONS VIA LOCKBOXES" filed Oct. 27, 2017, which claims the benefit of U.S. Provisional Patent Application No. 62/523,116 filed Jun. 21, 2017, and is a continuation-in-part of U.S. patent application Ser. No. 15/466,706 filed Mar. 22, 2017, which claims the benefit of U.S. Provisional Patent Application No. 62/318,054, filed on Apr. 4, 2016, all of which are hereby incorporated by reference in their entirety.

BACKGROUND

Providers of banking services provide a plethora of financial services to customers to assist in the completion of transactions and to meet the needs of the customers. One service includes assisting with transactions that involve "in-hand" funds, for example, the withdrawal or deposit of cash. Currently, a customer may engage in the withdrawals and deposits of these funds by walking into a branch location of a provider and initiating the withdrawal or deposit request via interaction with a teller at the branch. However, the customer is only able to access the provider during operating hours, which are usually between the hours of 9 AM to 5 PM. Many customers may find these hours inconvenient and in conflict with their work schedules, requiring them to leave a job during the work day to complete the desired transaction. Some provider branch locations may offer an afterhours drop-box deposit service, but this is limited to availability and requires the customer to travel to a branch location that offers the service, the location possibly being far away from the customer's location. While a provider may have automated teller machines (ATMs) in various locations outside of a branch location to allow the customer, at any hour of the day, to withdraw cash after authenticating at the ATM, the type of transactions may be limited to just withdraws and deposits. Despite the ability to engage in these "in-hand" fund transactions inside branch locations and at ATMs, there is a need for more flexible systems and methods to engage in these transactions, more convenience, and a more time effective method to complete these transactions.

SUMMARY

Various embodiments relate to a method performed by a processor of a provider computing system. One example method includes receiving a lockbox pickup transaction order from an account holder to execute a transaction from a financial account of the account holder. The lockbox transaction order includes at least one of a transaction identification, pickup device identifier, and a transaction location. A lockbox associated with the provider is identified from a plurality of lockboxes based on the transaction identification and the transaction location. A lock request is transmitted to the lockbox. The lock request includes the transaction identification, an identifier associated with the lockbox, and the pickup device identifier. The lockbox associated with the identifier is prepared according to the transaction identification and accessible by a user device associated with pickup device identifier.

Various other embodiments relate to a method performed by a processor of a provider's lockbox computing system. One example method includes receiving, from a provider computing system, a transaction identification and access information. A lockbox being one from a plurality of lockboxes associated with the lockbox computing system is configured. Configuring the lockbox is based on the transaction identification and access information. The lockbox is locked. Unlocking the lockbox occurs by a mobile device and the access information. An unlock attempt by the mobile device is received. The unlock attempt is authenticated. The unlock attempt is authenticated by comparing a mobile device and the access information. An unlock command is transmitted to the lockbox based on the authentication.

Various other embodiments relate to a lockbox. The lockbox includes an access control device. The access control device is operably connected to a lock. The access control device includes a network interface configured to communicate data to and from a lockbox and an authentication computing system over a network. A processing circuit is structured to receive an unlock attempt from a mobile computing system. The unlock from the mobile computing system is authenticated. An unlock command is transmitted based on the authentication.

Various other embodiments relate to a computing system with a provider. The computing system includes an inventory database having information relating to the use and availability of a plurality of lockboxes at lockbox locations and the use and availability of an amount of currency and denominations of currency at the lockbox locations. A network interface is configured to communicate data to and from a lockbox computing system associated with the provider and a user device associated with a user over a network. A lock management circuit is structured to receive a lockbox transaction order from a user device associated with an account holder of the provider. The lockbox transaction order includes a transaction identification and a transaction location. A lockbox location with the amount of currency and denomination to accommodate the lockbox transaction order is identified. A lockbox is identified from a plurality of lockboxes associated with the provider based on the transaction identification and the transaction location. A lock request is transmitted to the lockbox. The lock request includes lockbox access information. A transaction information is transmitted to the user device. The transaction information includes a lockbox location and lockbox access information.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
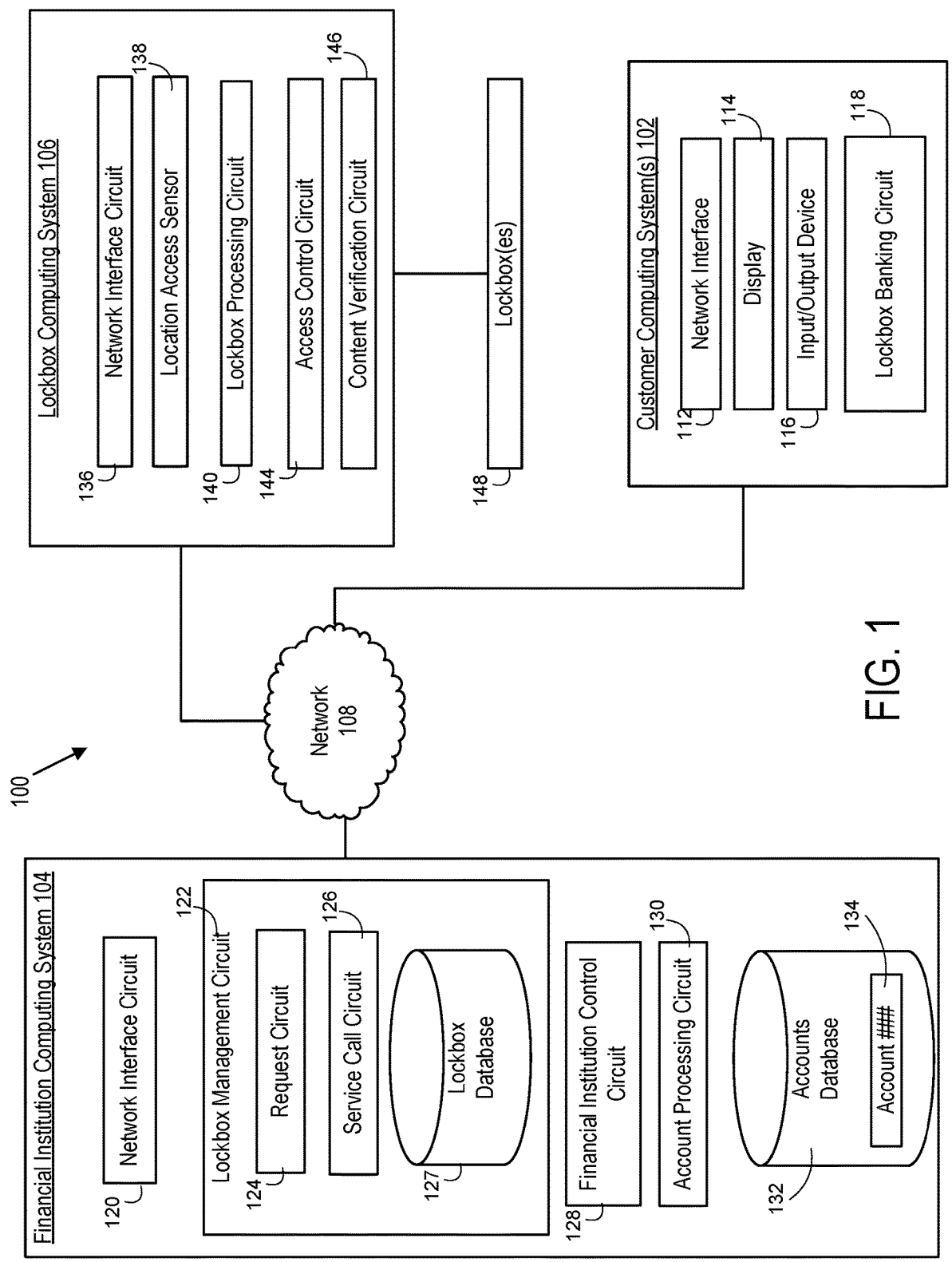
FIG. 1 is a schematic diagram of a lockbox pickup transaction processing system, according to an example embodiment.

Referring generally to the figures, systems and methods for withdrawing, depositing and exchanging currency (e.g., U.S. dollars, euros, yen, etc.) via a lockable box pickup service using a primary fiat currency account are described. The term "lockable box" includes a wide variety of shapes in addition to the traditional grid of rectangles as seen when viewed from the front, for example, the boxes may be hexagonal, octagonal, circular, heart shaped, trapezoidal, triangular, shapes conducive for stacking, shapes conducive for aligning, shapes that fit in with other lockable boxes to form an overall shape or design, and the like. The term lockable box includes lockable cubbies, lockers, compartments, cabinets, drawers, bins, baskets, boxes, caddies, capsules, cartridges, receptacles, shells, chests, trunks, canisters, cubes, cubicle, cell, and the like, herein collectively referred to as "lockbox" or "lockboxes." By way of example, the lockboxes may be located in a mall to provide currency and other documentation to tenants of the mall at a location that is frequented by mall store employees (e.g., near the food court). Additionally, the lockboxes could be located at a student union at a university as a circular container that allows a parent wanting to send their kid physical cash to have the lockbox loaded.

The embodiments described herein alleviate the time uncertainty and inconvenience associated with conducting currency transactions involving the physical passing of items (e.g., coins and bills) that are limited to a provider's operating hours. For example, various embodiments reduce the uncertainty of wait time and organize the transaction before the account holder arrives at the provider's lockbox location to complete the transaction. The described systems and methods enable account holders to easily engage in withdrawals, deposits, currency exchanges, and the like in accordance with the account holder's terms, time and schedule, at any one of the lockbox locations near the customer.

As described in further detail below, the account holder interacts with the provider, at the leisure of the account holder, to submit a request to complete a transaction via one of the provider's lockboxes. The account holder selects from a variety of options including a transaction type, a transaction amount, a transaction location, and a transaction time, in order to structure a transaction to the account holder's needs. For example, the account holder can interact with the provider via a provider application or website in real-time to receive open lockbox pickup transaction times and locations for all of the provider lockbox locations. On the back-end, the provider works with the available lockboxes to provide the account holder with the available time slots and locations to complete the account holder's transactions. Once a request is submitted, the provider sends a set of instructions to the lockbox location that hosts the selected lockbox, in order to facilitate the organization of the transaction items to complete the transaction. The account holder can submit the request on any web-enabled device, for example a desktop, laptop, cellphone, or other mobile computing devices. The request relates to a deposit of funds, a withdrawal of funds, an exchange of a first type of funds for a second type of funds (e.g., a foreign exchange transaction, an exchange of bills for coins, an exchange of coins for bills, etc.), or the like. Once the request is submitted, the provider identifies a suitable lockbox for the transaction, informs the account holder of the lockbox location and the transaction complete time, and configures the lockbox for completion of the transaction (e.g., by loading the lockbox with funds). Accordingly, the account holder will have certainty that, when arriving at the lockbox location at the designated date and time, the transaction can be completed.

FIG. 1 is a schematic diagram of a lockbox transaction request processing system 100, according to an example embodiment. The lockbox transaction request processing system 100 includes one or more customer computing system(s) 102, a provider computing system 104 associated with a provider (e.g., a bank), and a lockbox computing system 106. Each of the customer computing systems 102, the provider computing system 104, and the lockbox computing system 106 are in operative communication with each other via a network 108. The network 108 may include, for example, the Internet, cellular networks, proprietary banking networks, and the like. In some arrangements, the provider computing system 104 and the lockbox computing system 106 are in communication via a secure network or intranet. The provider computing system 104 may be operated by a provider of financial services (e.g., banking, credit, etc.).

Generally, customers (e.g., an account holder at the provider) may use the lockbox transaction request processing system 100 to submit a request to the provider computing system 104 to engage in a requested transaction at a lockbox located at one of the lockbox locations associated with the provider (e.g., the lockbox computing system 106). Through a user interface provided by the provider (e.g., via a smartphone application, via an online banking website, etc.), the customer can authenticate himself as an account holder with the provider, select a desired transaction type (e.g., withdrawal, deposit, exchange, etc.), provide relevant transaction details (e.g., amount of currency, type of currency, desired date and time of transaction), and identify a location of a lockbox 148 where the customer can complete the transaction at the customer's leisure (e.g., by selecting an available lockbox on the user interface, by affirming a provider suggested available lockbox, etc.). The provider computing system 104 automatically generates and executes commands to direct the lockbox location to complete the customer's request. The lockbox computing system 106 controls the lockboxes 148 at a given lockbox location. The lockbox computing system 106 is structured to configure a lockbox 148 at its location to be ready for the customer's transaction.

The customer computing systems 102 include a network interface circuit 112, a display 114, an input/output device 116, and a lockbox banking circuit 118. The network interface 112 is structured to facilitate operative communication between the customer computing systems 102 and other systems and devices over the network 108. The customer computing systems 102 can include any of smartphones, tablet computing systems, laptop computing systems, desktop computing systems, PDAs, smart watches, smart glasses, tablets, etc.

The display 114 is structured to present user interfaces to the account holders. For example, when customers use the customer computing systems 102 to access a provider application or website, the display 114 presents account information, transaction information, and the like, to the customers. The input/output device 116 is structured to receive input from the customer via the customer computing systems 102. In some arrangements, the display 114 and the input output device 115 are combined (e.g., as a touchscreen display). As described in further detail below, the input/output relates to lockbox transaction requests, location selection, personal information, and other information used to facilitate transactions between the provider, the customers, and the lockbox locations. The input/output device 116 can be used by the customer to provide transaction details (e.g., transaction type, lockbox location, transaction amount in U.S.D. currency or foreign currency, etc.) to be carried out by the provider computing system 104. The input/output device 116 may include a keyboard, a mouse, a touchscreen, a biometric sensor (e.g., a fingerprint sensor), a microphone, a camera, etc.

The lockbox banking circuit 118 is structured to provide the customer with a user interface to arrange for financial transactions with the provider via one of the lockboxes 148. For example, via the lockbox banking circuit 118, the customer can withdraw funds, deposit funds, exchange funds or complete similar transactions at a lockbox 148. The lockbox banking circuit 118 includes program logic (e.g., stored executable instructions) structured to implement at least some of the functions described herein. In some arrangements, the lockbox banking circuit 118 is created by accessing a lockbox banking website via a web browser (e.g., Safari®, Chrome®, Internet Explorer®, etc.) structured to receive and display web pages received from the provider computing system 104. In other arrangements, the lockbox banking circuit 118 includes a dedicated application (e.g., a smartphone application), a text message interface, or another program suitable for communicating with the provider computing system 104 over the network 108 in order to facilitate the customers' ability to have a lockbox 148 prepped and ready for the customer specified transaction. The customer logs into his or her existing provider account by providing online banking credentials (e.g., a username and password) via the lockbox banking circuit 118 and submit a lockbox transaction request, with available lockbox locations and pickup windows in response to the customer transaction type and customer location. The lockbox banking circuit 118 can also provide the customer with transaction details including lockbox location, lockbox number, or any passcode information. Example interfaces generated by the lockbox banking circuit 118 for display to the customer via the display 114 are shown in FIGS. 5A-D.

In some arrangements, the provider computing system 104 provides the lockbox banking circuit 118 in part through a software application made available for download and installation on the customer computing systems 102 (e.g., via the online banking website of the bank, via an app store, or in another manner). Responsive to a user selection of an appropriate link, the lockbox banking circuit 118 is transmitted to the customer computing system 102 from the provider computing system 104 and cause itself to be installed on the customer computing system 102. After installation, the thus-modified customer computing system 102 includes the lockbox banking circuit 118 for requesting a lockbox transaction through the customer's deposit account (embodied as a processor and instructions stored in non-transitory memory that are executed by the processor).

The provider computing system 104 includes a network interface circuit 120, a lockbox management circuit 122, a provider control circuit 128, an account processing circuit 130, and an account database 132. The provider computing system 104 may, for example, comprise one or more servers each with one or more processors configured to execute instructions stored in a memory, send and receive data stored in the memory, and perform other operations to implement the financial services described herein associated with the processing modules, databases, and processes. The provider computing system 104 may also provide banking services that include demand deposit accounts, credit services, loan services, investment services, and the like.

The network interface 120 is structured to facilitate operative data communication between the provider computing system 104 and other systems and devices over the network 108 (e.g., the customer computing systems 102, the lockbox computing system 106, etc.).

The lockbox management circuit 122 is structured to facilitate the back-end process necessary to conduct lockbox transaction via the customer's financial account 134. For example, the lockbox management circuit 122 is structured to receive, generate and send instructions (e.g., based on a customer transaction request) to a given lockbox 148 via the lockbox computing system 106 to facilitate the requested transaction. The lockbox management circuit 122 includes the request circuit 124, the service call circuit 126 and a lockbox database 127.

The request circuit 124 is structured to receive and process a customer transaction request to engage in the lockbox service. The request circuit 124 has access to the lockbox database 127. The lockbox database 127 contains all information regarding the locations of the lockboxes 148, the lockbox types, the lockbox availability, lockbox location currencies supply and other information related to attributes of a customer transaction request. For example, the request circuit 124 is initiated in response to the customer opening the lockbox banking circuit 118 on the customer computing system 102 and initiating a lockbox transaction request. In some arrangements, the request circuit 124 is in real-time communication with the customer interface such that the information fields for the request displayed on a given customer computing system 102 updates in response to the customer entries. For example, if the customer were to select the exchange currency option and enter the customer's zip code, the request circuit 124 determines, by accessing the lockbox database 127, that out of the plurality of lockbox locations near the customer's location, only two of the locations could complete the requested transaction. The request circuit 124 could limit the display of the lockbox locations to those two lockboxes 148. In other arrangements, the request circuit 124 receives all the relevant transaction request details (e.g., transaction type, lockbox location, transaction amount in U.S.D. currency or foreign currency, etc.) and then makes the determination of feasibility. For example, the request circuit 124 could receive a transaction request for a withdrawal of 20 U.S.D., by 5:00 PM at the lockbox location on 123 Street. The request circuit 124 could access the lockbox database 127 and determine that the user-submitted location is capable of completing the requested transaction, resulting in the request circuit 124 approving that transaction. Alternatively, the request circuit 124 could determine that the requested lockbox location would not be able to complete the requested transaction, and the request circuit 124 could deny the request or provide to the requesting customer alternative locations or times that could complete the transaction.

Upon approval of a request by the request circuit 124, the service call circuit 126 is structured to generate and transmit the transaction instructions (e.g., transaction type, passcode information, transaction amount in U.S.D. currency or foreign currency, etc.) to the lockbox computing system 106. The lockbox computing system 106 is located at a lockbox location that has one or more lockboxes 148. For example, a single lockbox computing system 106 may control the operation of a plurality of lockboxes 148 located in a convenience store, in a bank branch lobby, or the like. The service call circuit 126 is also in communication with the lockbox database 127. The service call circuit 126 identifies a specific lockbox 148 and organizes the passcode information for the transaction request based on the information in the lockbox database 127. For example, the request circuit 124 can compile and provide the finalized request information to the service call circuit 126 which in turn assigns a lockbox 148 at the lockbox location for the transaction and generates a passcode type for the lockbox lock. The service call circuit 126 includes a command to lock the lockbox number in accordance with the passcode information. In some arrangements, the service call circuit 126 can be structured to transmit the finalized transaction details, including the lockbox number and passcode information, to the customer computing system 102. As will be appreciated, the service call circuit 126 can be structured to communicate with or control a delivery mechanism (e.g., human worker at the branch, automated dispenser, autonomous device, drone, and the like).

The provider control circuit 128 is structured to facilitate authentication of a requesting customer at a lockbox location (e.g., at a specific lockbox 148, at the lockbox computing system 106, etc.). The provider control circuit 128 is in communication with the access control circuit 144 of the lockbox computing system 106 to determine whether the passcode and information provided at a lockbox 148 in a lockbox location is correct, in order to grant the requesting person access to the lockbox contents. In some embodiments, the provider control circuit 128 facilitates the storage of the lockbox passcode, customer identification and associated lockbox number for all lockbox transaction requests authenticating a request event at a lockbox 148 captured and transmitted by the access control device 140. The information can be stored in the lockbox database 127, the accounts database 132, or either location. In some arrangements, the provider control circuit 128 receives a completed transaction details from the lockbox computing system 106, the completed transaction details including the remaining contents of the lockbox 148 to adjust the customer's financial account accordingly. An example embodiment of the provider control circuit 128 is described in FIG. 2, which is described in further detail below.

The account processing circuit 130 is structured to track, maintain and incorporate transaction details for an account enrolled in the lockbox transaction service with the provider. The account processing circuit 130 interacts with the lockbox management circuit 124 and the provider control circuit 128 to properly adjust the customer's financial account. In some arrangements, the account processing circuit 130 debits or credits the customer's financial account when the lockbox management circuit 124 completes a request, in order to prevent double usage or early usage of the transaction funds. Upon the provider control circuit 130 receiving the completed transaction details, the account processing circuit 130 finalizes the adjustment of the customer's financial account (if applicable). The account processing circuit 130 can also check to ensure that the customer is authorized to use the customer's existing financial account to use the lockbox transaction service. Additionally, the account processing circuit 130 stores all transaction information in an accounts database 132 within the provider computing system 102. In some embodiments either the lockbox computing system 106 or the provider computing system 104 keeps track of all the lockbox transaction that are submitted and completed by a customer, in order to comply with any regulatory rules. In other embodiments, both the provider and the lockbox computing systems 104, 106 keep track of the transaction history, including the details from request submission to completion by the customer.

The financial account database 132 is structured to store account information and transaction records for a plurality of customers of the provider. The accounts database 132 stores, for example, information regarding an account holder's, age, membership date, account numbers and type of accounts held by the customer, various statements (e.g., credit/debit statements for the accounts), passcode information, and so on for a plurality of account holders. The account database 132 stores details regarding types of accounts held within a provider, the type of account holder, whether he or she is authorized for the lockbox transactions, information and video of each lockbox transaction, and so on for a plurality of customers. A specific account 134 may have a multi-use passcode, for example, a lockbox fob or a biometric sample, that is stored in the accounts database 132 and used by the provider control circuit 128 to authenticate a customer. In particular, the account database 132 stores each transaction that occurred, and each payment includes the amount of the transaction, the transaction type and the source of the transaction.

The lockbox computing system 106 includes a network interface circuit 136, a location access sensor 138, a lockbox processing circuit 140, a lockbox database 142 an access control circuit 144, a content verification circuit 146. Generally, the lockbox computing system 106 controls the operation of and access to a plurality of lockboxes 148. The lockbox computing system 106 facilitates the instructions generated by the provider for a requested transaction. The lockbox computing system 106 is structured to receive a service call from the provider computing system 104, configure a lockbox 148 at the given lockbox location in accordance with the transaction details, and facilitate the authentication and completion of the transaction at the lockbox 148 when the customer arrives. In some arrangements, the lockbox computing system 106 controls a plurality of lockboxes 148 at a given location of lockboxes 148. For example, a building containing fifty lockboxes is controlled by a first lockbox computing system 106 connected to the provider computing system 104, and another location containing ten lockboxes is controlled by a second lockbox computing system 106 connected to the provider computing system 104. In other arrangements, the lockbox computing system 106 controls facilitating the instructions to, authentication and unlocking of all of the lockboxes 148 in the service. In some arrangements, each lockbox computing system 106 is associated with a single lockbox 148.

The network interface 136 structured to facilitate operative data communication between the lockbox computing system 106 and other systems and devices over the network 108 (e.g., the customer computing systems 102, the provider computing system 104, etc.).

The location access sensor 138 is structured to grant access to the lockbox location to a requesting entity. In some arrangements, the customer cannot access the lockboxes 148 until the customer authenticates, and is granted access, to the lockbox location facility. For example, there may be a locked door that requires the customer to swipe a credit or debit card issued by the provider to unlock the door to the lockbox facility. The location access sensor 138 is in communication with the provider computing system to gain access to the requesting customer's passcode and account information in order to authenticate the customer.

The lockbox processing circuit 140 is structured to track, maintain, and incorporate lockbox transaction details for an account enrolled in the lockbox transaction service with the provider. The lockbox processing circuit 140 is structured to receive a service call from the lockbox transaction service call circuit 126 from the provider computing system 104. Upon receiving the transaction service call, the lockbox processing circuit 140 ensures the lockbox 148 at the lockbox location is ready for the customer. For example, the lockbox processing circuit 140 facilitates a print out of a transaction request instruction on a computer screen of an employee at the lockbox location. The employee would then load the lockbox 148 in accordance with the instructions, for example, placing an amount of U.S.D. into a lockbox 148 and setting the passcode for the lockbox 148. In some arrangements, the lockbox processing circuit 140 is operably connected to a processor that controls the lockboxes 148, wherein the contents of the lockbox 148 are loaded through an automated service. In some embodiments, a combination of employee interaction and automated actions are utilized to get the lockbox 148 ready for the customer requested transaction.

The access control circuit 144 is structured to receive an authentication request at the lockbox computing system 106 that manages the lockbox location and the access control circuit 144 determines whether to grant the requestor access to the lockbox 148. The access control circuit 144 is in communication with the provider control circuit 128 of the provider computing system 104 to determine whether the passcode and information provided at a lockbox 148 in a lockbox location is correct, in order to grant the requesting person access to the lockbox 148 contents. The access control circuit 144 is operably connected to the lockboxes 148. In some embodiments, one access control circuit 144 controls a plurality of lockboxes 148. In other embodiments, one access control circuit 144 controls a single lockbox 148. In some arrangements, the access control circuit 144 transmits a completed transaction details to the provider computing system, the completed transaction details including the remaining contents of the lockbox 148 to adjust the customer's financial account accordingly. In some arrangements, the access control device contains the customer identification and the customer passcodes for the lockbox transactions. An example embodiment of the access control circuit 144 is further described in FIG. 2.

The content verification circuit 146 is structured to examine the contents of a lockbox 148. The content verification circuit 146 is set up to ensure the proper transaction materials are placed in the lockbox 148 and/or removed from the lockbox 148. For example, the content verification circuit may be set up to an ATM-like device that dispenses a box or roll of coins into a lockbox 148 to satisfy a withdrawal request or can receive an amount of currency to satisfy a deposit request or exchange request. Accordingly, the content verification circuit 146 may include any of bill dispensers, coin dispensers, bill receivers, coin receivers, cameras, and the like. The content verification circuit 146 is set up to alert the receipt or placement of currency into a lockbox 148. For example, the content verification circuit 146 could be operably connected to a sensor that generates an alert when an amount of currency is removed from the lockbox 148. The content verification circuit 146 determines that the transaction has been completed and locks the lockbox 148.

The lockboxes 148 are structured to be a secure receptacle to complete the transaction. Each lockbox 148 is connected to the access control circuit 144 and the content verification circuit 146 of the lockbox computing system 106 to facilitate the locking and unlocking of the lockbox 148. The lockbox 148 can be configured to facilitate a variety of transactions. An example embodiment of the lockbox 148 is further described below with respect to FIG. 2.

Figure 2:
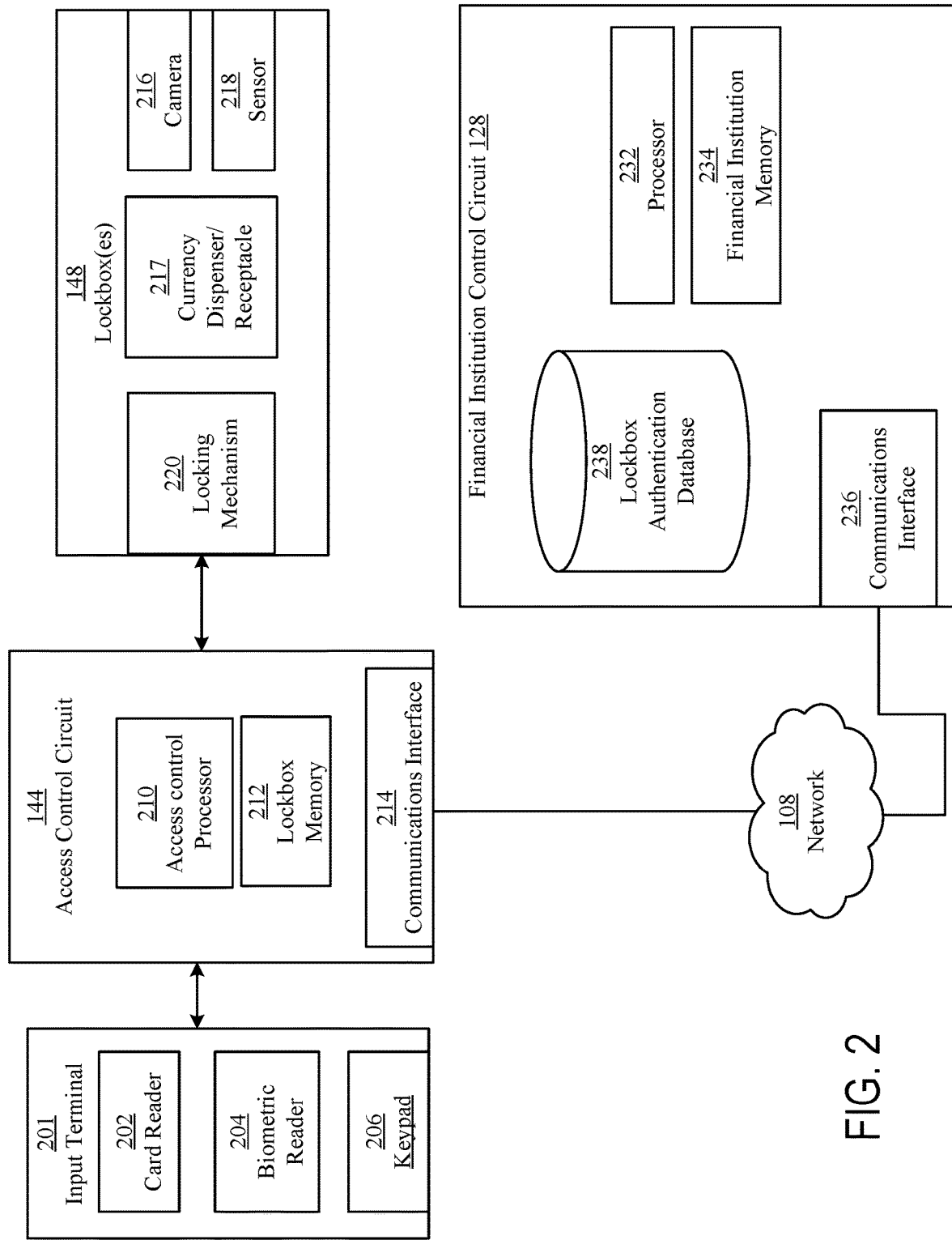
FIG. 2 is a detailed view of an access control device and its interactions with the lockboxes and the provider computing system.

Referring now to FIG. 2, a detailed view of the access control circuit 144 and its interactions with the lockboxes 148 and the provider computing system 104 is shown according to an example embodiment. The access control circuit 144 is operably connected to at least one lockbox 148 and to the provider control circuit 128 via the network 108. The access control circuit 144 is located at a location containing a plurality of lockboxes 148 and is connected to and controls the unlocking at each lockbox 148 in the location. The access control circuit 144 controls the unlocking/locking of a lockbox 148 via the locking mechanism 220. The provider control circuit 128 is located in a provider computing system 104 off-site from the lockbox location.

The lockbox 148 is structured to facilitate a transaction, for example, a withdrawal, a deposit or a currency exchange. In some arrangements, the lockbox 148 includes a camera 216, a sensor 218 and a locking mechanism 220. In some arrangements, the lockbox 148 has an ATM-like device 217 inside of it to facilitate the transaction (e.g., as described above with respect to FIG. 1). For example, if the customer requested a withdrawal transaction, a device could dispense the amount of U.S.D. in coins (either rolled, free change, boxed, etc.) that the customer requested. In a deposit transaction, a device could allow the customer to insert the currency, for example utilizing an apparatus that takes in paper and coin currency and is able to determine the type and amount of the currency. In exchange transactions, both mechanisms can be used in tandem, the receiving apparatus to take and determine the customer provided U.S.D. and the dispensing apparatus to provide the customer with the equivalent amount of foreign currency. The device could be connected to a repository of currency or each lockbox 148 could store the currency within itself, being loaded by an employee at the lockbox location or through automated mechanisms. In other arrangements, the lockbox 148 could contain open space for which the customer can place currency, remove currency, or, in exchange transaction, remove and place currencies. For example, the lockbox could be similar to a locker. A lockbox location has a plurality of lockbox types, with different mechanisms or features in a single lockbox 148 to facilitate certain types of transactions. In some arrangements, the customer could request a lockbox type in addition to their transaction details.

The lockbox 148 could be constructed to incorporate the various passcode options and the plurality of input devices, 202, 204, 206 instead of having a central input terminal. In some arrangements, the outside of the lockbox 148 has a biometric sensor, a card reader, a keypad, a bar code sensor, a fob sensor, or the like. In other arrangements, there is a single input terminal for the lockbox location that allows for a customer to select a lockbox number and provide the authentication input. In some arrangements, the passcode options available to the customer are limited to the available lockbox authentication devices on the lockboxes 148 at the selected lockbox location.

The locking mechanism 220 controls access to the lockbox 148. The locking mechanism 220 may include an electronic lock, latch, or other mechanism configured to lock, unlock, open, close, or otherwise control access through an access point. In some embodiments, the locking mechanism 220 includes a solenoid, motor, actuator, or other mechanical device configured to physically lock or unlock a door or other access point. In some embodiments, locking mechanism 220 includes a magnetic lock configured to selectively power and de-power an electromagnet that holds a door in a locked position. The access control circuit 144 receives access requests via the card reader 202 or other user input devices (e.g., by receiving or reading a security credential from a user or user device). The access control circuit 144 processes the access requests using the access control processing circuit 210 and generates access request events. The access request events may include timestamps, access control device IDs, security credentials, user IDs, or any other information describing the access requests. The access control circuit 144 sends the access request events to the provider control circuit 128 via the network 108. In response to the provider control circuit 128, the access control circuit 144 operates the locking mechanism to allow or deny access to the lockbox 148. Upon completion of a granted access event (e.g., removal of currency, placement of currency, etc.), the lockbox 148 can be automatically re-locked.

The camera 216 is any device that records the lockbox 148 during the transaction. The camera 216 may be situated in view of an array of lockboxes 148 in the lockbox location, it may be situated inside or outside of the lockbox 148. In some arrangements, there are a plurality of cameras 216 associated with the lockbox 148 and the lockbox location. In such arrangements, cameras may be placed both inside of the lockbox 148 and in the surrounding area such that transactions can be monitored. In some embodiments, the camera 216 is not triggered until the customer begins to input a passcode into a lockbox 148 or into the lockbox computing system 106. In other arrangements, the camera is constantly monitoring the location and the lockboxes 148. In some embodiments, the video captured by the camera 216 during the transaction is parsed out and sent to the provider along with the completed transaction details.

The sensor 218 can be any device inside the lockbox 148 to facilitate the transaction. In a deposit transaction, the sensor could allow the customer to insert the currency, for example utilizing an apparatus that takes in paper and coin currency and is able to determine the type and amount of the currency. In exchange transactions, both mechanisms can be used in tandem, the receiving apparatus to take and determine the customer provided U.S.D. and the dispensing apparatus to provide the customer with the equivalent amount of foreign currency. In some embodiments, the lockbox 148 has a sensor that can determine when currency is removed or placed into the lockbox 148, for example a pressure sensor. When detecting a change in the weight of the lockbox 148 following an access event, the sensor 218 will communicate to the access control circuit 144 the change, in order to re-lock the lockbox 148. In some arrangements, there is no sensor in the lockbox 148 and a lockbox location employee inspects the lockbox 148 after the transaction to ensure that it was carried out in accordance with the customer request. In some embodiments, the sensor 218 is connected to the ATM-like receiving and dispensing currency device 217. For example, the sensor 218 is set up to alert the receipt or placement of currency into a lockbox 148 or generates an alert when an amount of currency is removed from the lockbox 148 via the currency device 217.

The access control circuit 144 is connected to the lockbox 148 and an input terminal 201 containing a plurality of input devices, 202, 204, 206. The access control circuit 144 is structured to authenticate an input terminal 201 access request by a customer at a lockbox location and determine whether to unlock the lockbox 148. As shown in FIG. 2, the access control circuit 144 contains an access control processor 210, lockbox memory 212, a communication interface 214, and a locking mechanism 220. In some arrangements, the access control circuit 144 may have a single input terminal 201 for receiving customer input, the single input terminal being connected to the locking mechanisms of all the lockboxes 148 at the location. In other arrangements, the access control circuit 144 may be operably connected to input devices that reside on each individual lockbox 148. The plurality of input devices includes a card reader 202 (e.g., an IC card reader), a biometric reader 204, and a keypad 206. The access control circuit 144 uses the input devices to receive input from a customer or from a security device possessed by the customer. For example, the card reader 202 is configured to read a smartcard possessed by a customer and automatically obtain a card ID from the smart card. Using either the card reader 202 or the keypad 206 the customer can input their user identification to provide the access control system 128 with the details to retrieve the passcode for the specific transaction. The biometric sensor 204 is structured to read a fingerprint, voice print, or other biometric marker. The keypad 206 is configured to receive an access code or other security credential from a user. In some embodiments, other inputs could be received by the customer, including a bar code scanner, a near field communication device, or a key fob. In some arrangements, a customer may have to provide two levels of authentication at the plurality of input devices. For example, the customer needs to use a card reader 202 to gain access to the lockbox location, and then use a keypad 206 attached to the individual lockbox 148 to gain access to the lockbox 148 contents.

The access control processor 210 is connected to a lockbox memory 212 and is structured to receive a password at one of the lockboxes 148 in a lockbox location and determine whether to grant access to the lockbox 148 to the requesting party. The access control processor 210 may be a general purpose or specific purpose processor, an application specific integrated circuit (ASIC), one or more field programmable gate arrays (FPGAs), a group of processing components, or other suitable processing components. The access control processor 210 is structured to execute computer code or instructions stored in memory 212 or received from other computer readable media (e.g., CD-ROM, network storage, a remote server, etc.). When the processor 210 executes instructions stored in the lockbox memory 212, the processor generally structures the access control processor 210 to complete such activities. The lockbox memory circuit 212 stores instructions related to receiving and transmitting a lockbox access request. The memory circuit 212 can also be structured to contain instructions for examining a lockbox 148 after it has been accessed by communicating with the sensor 218. For example, following an access event at the lockbox 148 configured for a deposit request, the sensor 218 determines if the lockbox 148 contains currency by examining the change in weight from pre-access to post-access.

The communication interface 214 is structured to provide communications with the access control system 128 over the network 108. The communications interface 214 may include wired or wireless interfaces (e.g., jacks, antennas, transmitters, receivers, transceivers, wire terminals, etc.) for conducting data communications with various systems, devices, or networks. For example, the communications interface 214 can include an Ethernet card and port for sending and receiving data via an Ethernet-based communications network. As another example, the communications interface 424 includes a WiFi transceiver for communicating via a wireless communications network. The communications interface 214 may be structured to communicate via local area networks (e.g., a building LAN), wide area networks (e.g., the Internet, a cellular network, etc.), and/or conduct direct communications (e.g., NFC, Bluetooth, etc.). In various embodiments, the communications interface 214 is configured to conduct wired and/or wireless communications. For example, the communications interface 214 may include one or more wireless transceivers (e.g., a WiFi transceiver, a Bluetooth transceiver, a NFC transceiver, a cellular transceiver, etc.) for communicating with mobile devices, for example with an employee at the lockbox location.

Turning now to the provider control circuit 128 in FIG. 2, the provider control circuit 128 is shown to include a processor 212, provider memory 234, a communications interface 236 and a lockbox authentication database 238. The provider control circuit 128 is located within the provider computing system 104, as shown in FIG. 1. In some arrangements, the provider control circuit 128 is located within the lockbox computing system 106 at the lockbox location.

The communications interface 236 may include wired or wireless interfaces (e.g., jacks, antennas, transmitters, receivers, transceivers, wire terminals, etc.) for conducting data communications with various systems, devices, or networks. For example, the communications interface 236 can include an Ethernet card and port for sending and receiving data via an Ethernet-based communications network. As another example, the communications interface 236 may include a WiFi transceiver for communicating via a wireless communications network. The communications interface 236 is configured to communicate via local area networks (e.g., a building LAN), wide area networks (e.g., the Internet, a cellular network, etc.), and/or conduct direct communications (e.g., NFC, Bluetooth, etc.). In various embodiments, the communications interface 438 is configured to conduct wired and/or wireless communications. For example, the communications interface 236 includes one or more wireless transceivers (e.g., a WiFi transceiver, a Bluetooth transceiver, a NFC transceiver, a cellular transceiver, etc.) for communicating with mobile devices.

The lockbox authentication database 238 is plurality of passcode information for an account holder/customer who is one of the parties attempting to gain access to a lockbox 148. The database links a customer identifier to a plurality of authentication information that can be used to approve access to the lockbox 148. The customer identifier for an account 240 can be, for example, a customer name, email address, phone number, picture or actual name of the customer. The authentication information can be a customer's passcode, biometric sample, lockbox fob information, a token, and the like. The customer passcode for the lockbox 148 can be temporary, for example, a provider generated string, or a multi-use passcode for lockbox 148 or provider transactions. The lockbox authentication database 238 stores the passcode and transaction information for the lockbox transactions at the lockbox location. To accomplish this, the lockbox authentication database 238 is in communication with the lockbox processing circuit 140.

The processor 232 and provider memory circuit 234 are structured to receive an authentication request from an access control circuit 144 at one of the lockbox locations and determine whether the received passcode and information matches the authentication information in the provider's database. The provider control circuit 128 can determine whether to provide a positive or negative authentication value for the provided information of the requesting party. The processor 232 may be a general purpose or specific purpose processor, an application specific integrated circuit (ASIC), one or more field programmable gate arrays (FPGAs), a group of processing components, or other suitable processing components. The processor 232 is structured to execute computer code or instructions stored in memory 212 or received from other computer readable media (e.g., CD-ROM, network storage, a remote server, etc.). When the processor executes instructions stored in memory 234, the processor generally structures the circuit 128 to complete such activities. The provider memory circuit 234 stores instructions related to receiving and authorizing authentication information for a lockbox access request. In some arrangements, the processor 232 may transmit the relevant customer identifiers and passcode information to the access control circuit 144 upon confirmation of the customer transaction request. For example, it is included in a service call from the provider computing system 104 to the lockbox computing system 106, the service call including the transaction details, the lockbox information and the customer authentication information.

Figure 3:
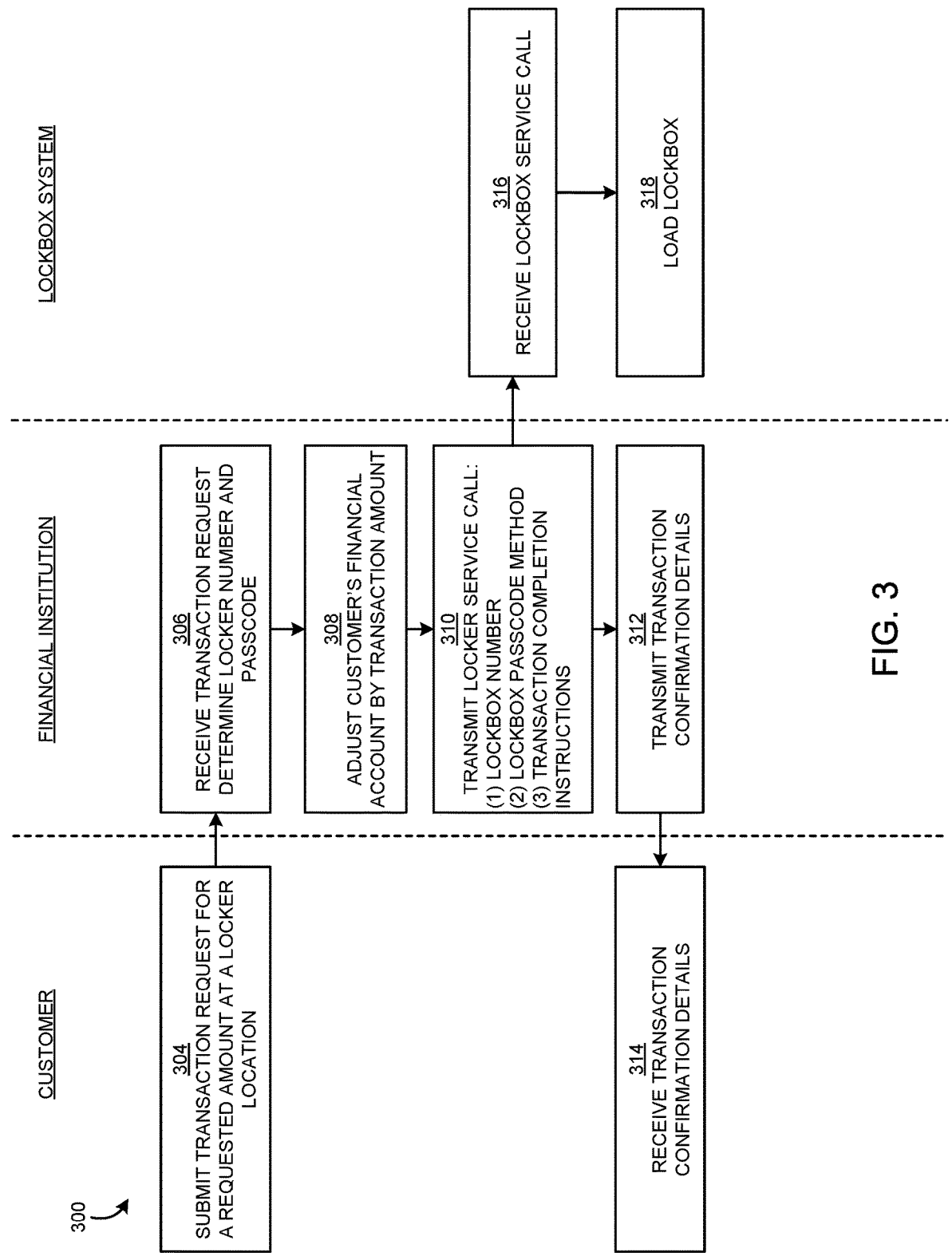
FIG. 3 is a flow diagram of a method of transmitting a lockbox pickup transaction request, according to an example embodiment.

Referring to FIG. 3 a flow diagram of a method 300 of transmitting a lockbox pickup transaction request is shown, according to an example embodiment. The method 300 is in connection with a customer (e.g., an account holder at the provider) and performed by a provider having a plurality of transaction lockboxes 148 at one or more lockbox locations. The provider is a provider that manages the provider computing system 104 of FIG. 1. The lockbox location is an entity that manages a plurality of lockboxes 148 at a lockbox location and manages the corresponding provider lockbox computing system 106 of FIG. 1.

At 304, a transaction request is transmitted from the customer to the provider. The customer device 102 transmits the transaction request to the provider computing system 104 via the network 108. The transaction request includes various details defining the parameters of a lockbox pickup transaction. For example, the transaction request includes a transaction type, a transaction amount, a lockbox location, a time window, and a financial account to use to facilitate the transaction. The transaction type can be a withdrawal, a deposit, a currency exchange or any other similar transactions involving the physical passing of items (e.g., coins and bills). For example, the customer could request an exchange, wherein the customer provides 100 U.S.D. at a designated lockbox 148 at a lockbox location in exchange for the equivalent amount in euros. In some arrangements, multiple transaction types are requested in a single request. In some embodiments, the lockbox location and time window can be determined by the provider computing system in real-time (i.e., the available lockbox locations on the user interface change, subject to availability) as the customer enters in the details. For example, the customer enters a currency exchange request and the provider may only have three lockbox locations that could complete the transaction on the day of the request. Alternatively, the provider may have no lockbox locations available for a transaction type for a given day, allowing the customer to only select future days in the time window field. In other embodiments, the customer submits a desired lockbox location and time window to the provider, and the customer receives a transaction request approval with the details, or a transaction request denial due to unavailability at the lockbox location at the specified time window.

At 306, the provider receives the transaction request from the customer. The request is transmitted from the customer computing system 102 and is received by the provider computing system 104 via the network 108. After receiving the request, the provider determines the feasibility of the transaction given the customer's parameters. For example, the provider may determine whether the requested lockbox location will be able to complete the withdrawal request between the 3:15 PM and 3:20 PM.

At 308, the provider adjusts the customer's financial account by the transaction amount (if necessary). The transaction amount includes the requested amount to be withdrawn or exchanged, and may also include fees associated with the transaction. Fees are any extra costs associated with the provider providing and carrying out the service. In some embodiments, the account may be tentatively adjusted, wherein the movement of the funds is shown in the account, but not yet finalized. For example, if the customer is withdrawing 100 U.S.D. from their account which has 1,000 U.S.D., upon submission of the request, the customer is only able to use 900 U.S.D. to initiate any subsequent transaction with that account as a source.

At 310, the provider transmits a service call to the provider's lockbox location to conduct the transaction. The provider computing system 106 transmits the service call to a lockbox computing system 106 in charge of the determined lockbox location. The service call includes several instructions regarding the transaction details, the lockbox number, the lockbox passcode and other transaction details. In an embodiment, the service call includes instructions to configure a lockbox 148 to get ready an amount of a currency to provide to the customer on arrival, for example in a withdrawal request. In other embodiments, the service call includes instructions to configure a lockbox 148 to collect a certain amount of a currency from the customer when unlocked. In some embodiments, the customer has to provide a passcode, for example an account password or a transaction specific passcode generated by the provider. In other arrangements, the customer may have to provide a biometric sample. In some embodiments, the customer has a fob for lockbox transaction that can be scanned at the lockbox 148 to authenticate the customer. In some arrangements, the service call to the lockbox location includes a command to store the pending transaction and locked configured lockbox 148 for a multiple amount of days, allowing the customer to complete the transaction at his or her leisure.

At 312, the provider transmits the transaction request confirmation details to the customer. The provider computing system 104 transmits the details to the customer computing systems 102, including the customer device, customer desktop, etc. The details include a transaction specific passcode or password for the customer to use to authenticate upon arrival at the lockbox location. In some arrangements, the details include information on how change or cancel a transaction request. At 314, the customer receives the transaction request confirmation details. The customer receives the transaction confirmation the next time he or she logs into his or her account, or it may be retrieved instantaneously through push notifications tied to the provider.

At 316, the lockbox computing system 106 that manages the chosen lockbox location receives the service call. In some embodiments, the lockbox location can alter the transaction details and send the changes to the provider, which in turn sends the update to the customer. For example, the lockbox location may have an unexpected issue that causes a delay in all the services, including the lockbox pickup service. At 318, the lockbox location prepares the transaction items. In some arrangements, the lockbox location may have to retrieve a-non U.S.D. currency from another location (e.g., another lockbox location or a currency exchange partner) ahead of the arrival of the customer. In other arrangements, the lockbox 148 is specifically constructed to complete the transaction type. In some arrangements, this is an ATM-like currency dispenser and receptacle. For example, if the transaction type is a currency exchange the lockbox 148 could be one that contains an ATM-like machine that will receive U.S.D. from the customer and upon verifying the amount deposited, the machine dispenses the equivalent amount in foreign currency. In other arrangements, an employee at the lockbox location receives an alert to load a lockbox 148 with the currency related to the customer's withdraw or exchange request. For example, the employee may open up the designated lockbox number, place the withdraw transaction funds into the lockbox 148, and lock the lockbox 148 using the passcode. As will be appreciated, the delivery mechanism to complete or organize the service call can include a human worker at the branch, automated dispenser, autonomous device, drone, and the like.

Figure 4:
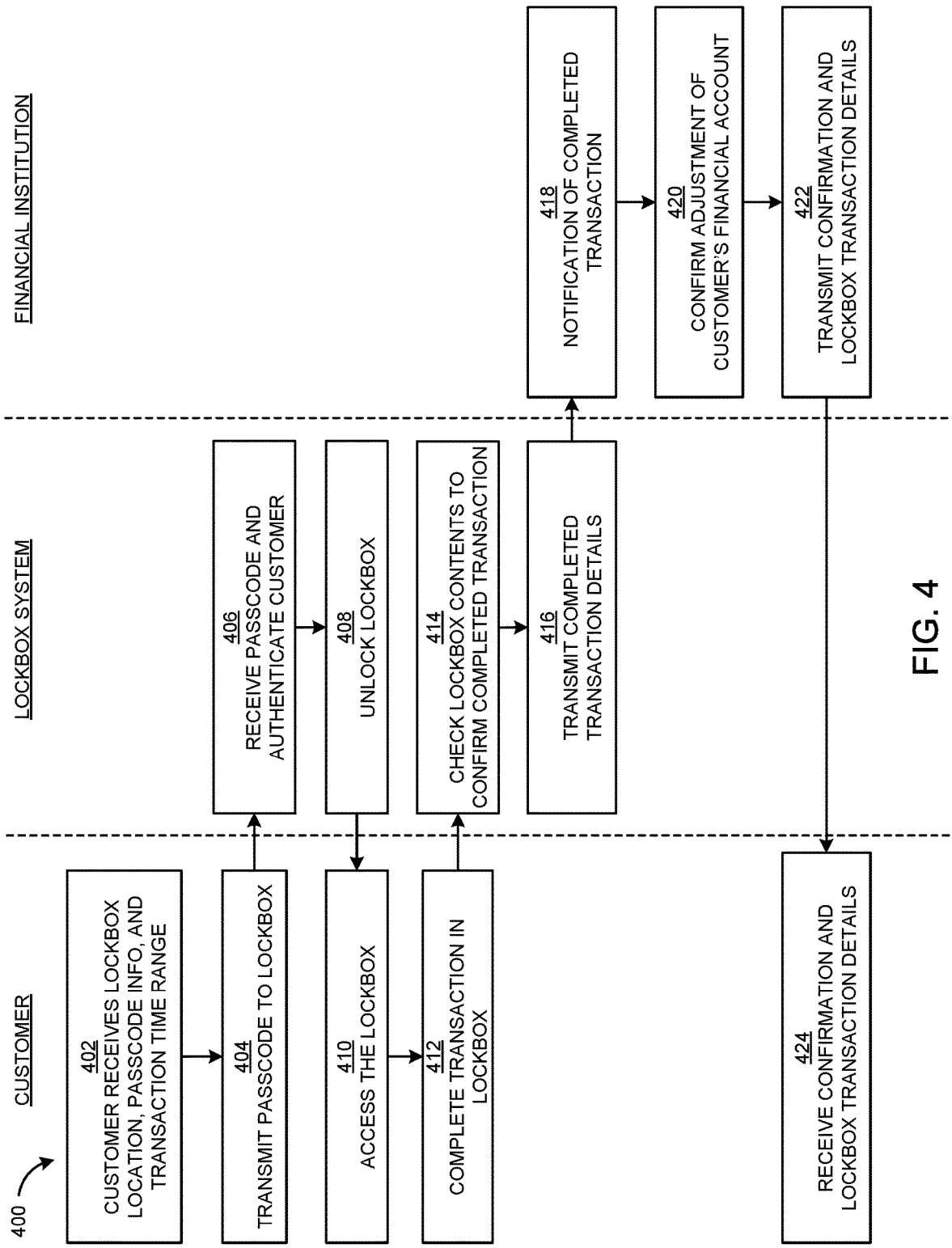
FIG. 4 is a flow diagram of a method of completing a lockbox pickup transaction request, according to an example embodiment.

Referring to FIG. 4, a flow diagram of a method 400 of completing a lockbox pickup transaction request is shown, according to an example embodiment. The method 400 may be performed in connection with the method 300 of FIG. 3. However, the method 400 may similarly be performed in connection with other types of transactions. The method 400 is shown in connection with a customer, a lockbox location of the provider, and a provider. For example, the customer may be an individual who operates the customer computing system 102 of FIG. 1. The lockbox location may be an entity that manages the provider lockbox computing system 106 of FIG. 1. The provider may be a provider that manages the provider computing system 104 of FIG. 1. However, the method 400 may be similarly performed by other systems and devices.

At 402, the customer receives the transaction request confirmation details. The customer device 102 receives the transaction request confirmation from the provider computing system 104 via the network. The transaction request confirmation details can include a lockbox location, any passcode authentication information, and a transaction time range. For example, the customer receives lockbox location street address and a designated lockbox number to access, a password of "password 123" which is needed to complete the withdrawal request, and a time window of after 1:15 PM. As described above in connection with step 312 of the method 300 of FIG. 3, the transaction request may include various details defining the parameters of the lockbox pickup transaction.

At 404, the customer arrives at the lockbox location after the time specified in the transaction request confirmation details. In some embodiments, the passcode is a customer carried passcode, for example, a debit card with the provider that is swiped or scanned to gain access. In some arrangements, the customer carried passcode could be an electronic token submitted via NFC using a customer device, or a lockbox fob special issued by the provider to authenticate the lockbox transactions. In some embodiments, the passcode could be a PIN code, a barcode reader or a biometric scan of the customer.

Upon transmission of the passcode by the customer, at 406, the provider lockbox system 106 receives a customer passcode notification. The customer device 102 could transmit the passcode to the provider lockbox system 106 when in close proximity to the specified lockbox. Alternatively, the customer could enter the authentication information into the input terminal 201. In some arrangements a camera could be viewing the lockbox 148, allowing the provider to ascertain the customer's identity for any disputes or issues arising out of the transaction. In some arrangements, a camera is also placed inside of the lockbox 148 to monitor the transmission of the transaction funds.

At 408, the lockbox 148 unlocks. The transaction items inside the lockbox includes the currency amount request for a withdrawal, a currency repository for a deposit request, a second currency type of the amount requested for a currency exchange request, or a combination of the like.

At 410, the customer accesses the transaction items. In some arrangements involving a deposit request, the customer inserts the currency into a collection device. In other arrangements involving a deposit request, the currency can be placed inside the empty lockbox 148. In some embodiments involving a withdrawal transaction, the requested currency can be placed within the lockbox 148. In other arrangements, the lockbox 148 could have an ATM-like device, connected to a currency repository, that dispenses the requested currency amount. Upon receiving access to the transaction items, at 412, the customer completes the transaction with the lockbox 148 and closes it, the lockbox 148 re-locking. In some arrangements, the customer has to provide a signature or swipe a card issued by the provider to finalize and complete the transaction.

At 414, the lockbox 148 is checked to ensure that the completed transaction was done in accordance with the requested transaction. In some arrangements, this check is done by a provider employee at the lockbox location. In some arrangements, a processor is able to scan or sense the lockbox 148 and determine the lockbox details. In some embodiments, the sensor will inform the customer that the transaction is incomplete (e.g., not enough funds were deposited for an exchange, or currency was left in the lockbox in a withdrawal). The customer device 102 would receive a message indicating the deficiency and how the customer can fix the issue, for example, by returning to the lockbox and taking all of the funds.

At 416, a transaction confirmation is generated by the provider's lockbox system 106 and sent to the provider. The transaction confirmation includes relevant transaction details, such as the type of transaction that occurred, the amount of the transaction, the time window of the transaction, the actual time the transaction occurred and additional notes on the transaction. In some embodiments, it may include a video, from the cameras situated in the lockbox location, of the transaction occurring. In some arrangements, the picture of the customer could be take and sent with the confirmation details.

At 418, the provider receives the notification of the transaction confirmation from the lockbox 148 and determines whether or not the transaction was completed correctly, and in accordance with the request. If the transaction completed details show a short coming by the lockbox 148, the provider will try to rectify those issues moving forward. This may improve the customer experience with the service.

At 420, the provider finalizes the adjustment of the customer's financial account by the transaction amount, such as in the initial adjustment of step 308 of method 300 of FIG. 3. The transaction amount includes the requested amount to be withdrawn, deposited or exchanged, and also include fees associated with the transaction. Fees are associated with the provider processing the transaction and/or for use of the lockbox pickup service.

At 422, the provider compiles a confirmation and lockbox pickup transaction details message to send to the customer. The details can be similar to the details transmitted in step 416 of method 400. At 424, the customer receives the confirmation and lockbox pickup transaction details. The customer may receive the confirmation and lockbox pickup transaction details the next time he or she logs into his or her account, or it may be retrieved instantaneously through push notifications tied to the provider.

FIGS. 5A-5D illustrate an example graphical user interface ("GUI") 500 that may be utilized to submit a lockbox pickup transaction request, according to an example embodiment. For example, the GUI 500 may be displayed to the customer via the customer computing system 102 of FIG. 1. The GUI 500, for example, may be the GUI 500 related to the lockbox banking circuit 118 (e.g., the GUI of the provider lockbox smartphone application, the GUI of the provider lockbox website, etc.). The GUI 500 may be utilized in connection with the method 300 of FIG. 3 and the method 400 of FIG. 4, according to example embodiments. For example, the customer may utilize the GUI 500 to submit a lockbox pickup transaction request, via method 300. As another example, the customer may utilize the GUI 500 to receive a lockbox pickup transaction request confirmation from the provider and complete the lockbox pickup transaction, via method 400. However, it should be understood that the GUI 500 may similarly be utilized on other devices to conduct lockbox pickup transactions.

Figure 5A:
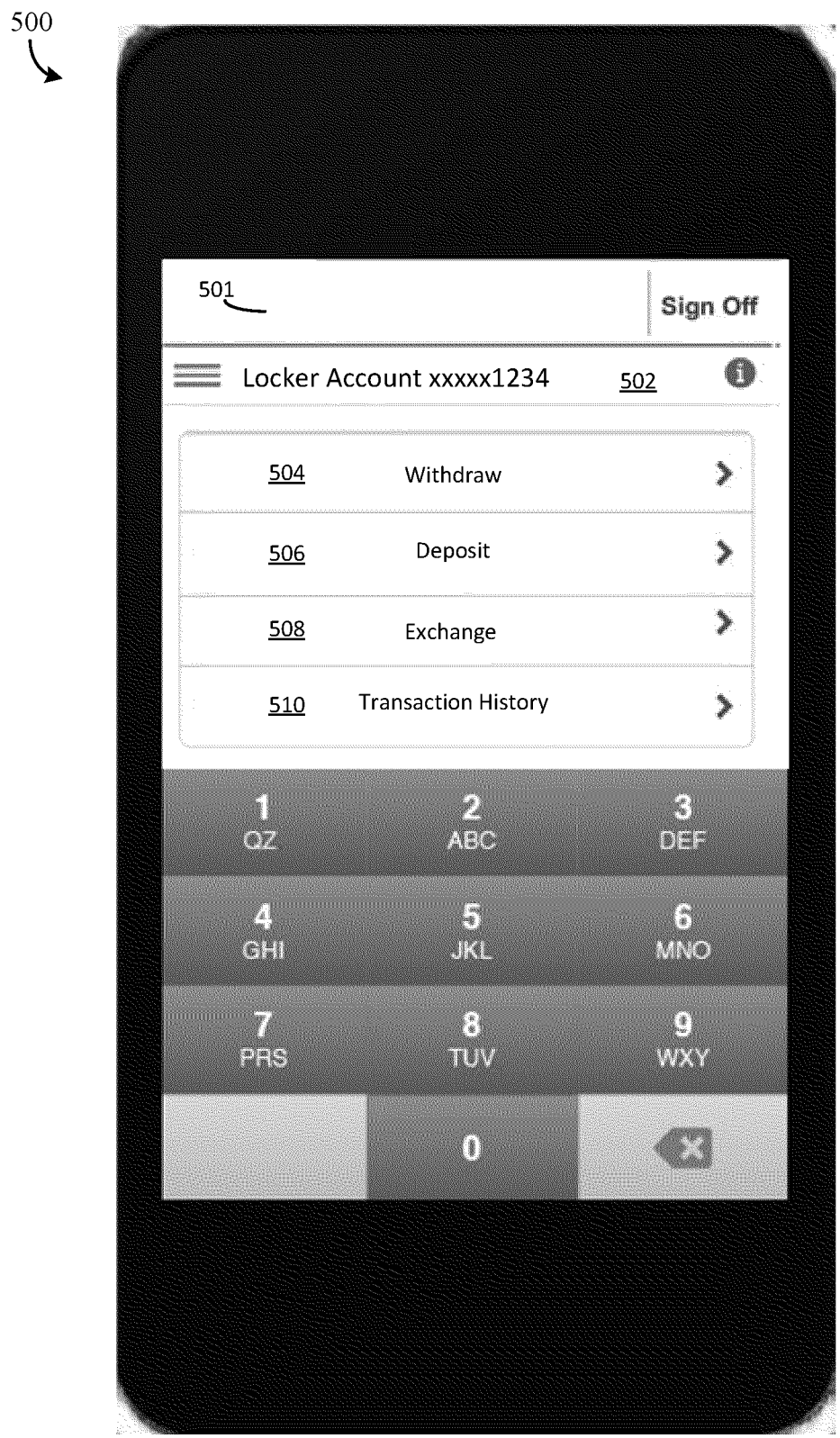
FIGS. 5A-5D illustrate display screens that may be displayed to the user during the process of FIG. 3 and FIG. 4.

FIG. 5A illustrates a menu page 501 of the GUI 500, according to an embodiment. The GUI 500 includes a mobile banking interface that is displayed to the customer after accessing the lockbox banking circuit 118 that has been installed on the customer computer system 102. In another embodiment, the GUI 500 is similarly be accessed via an online banking website. Upon accessing the GUI 500, the customer is prompted to provide login credentials to gain access to the account with the provider. By providing such credentials, the customer is provided with the full functionality of the online banking system in the lockbox banking circuit. In an example embodiment, the menu page 501 includes a plurality of menu option for the customer's specific fiat currency financial account 502. In this example, the customer is authorized to execute lockbox pickup services from the customer's fiat currency financial account. The menu page 501 includes several menu buttons labeled with a corresponding action. For example, the menu buttons include a withdraw button 504, a deposit button 506, an exchange button 508, and a transaction history 510 button.

Figure 5B:
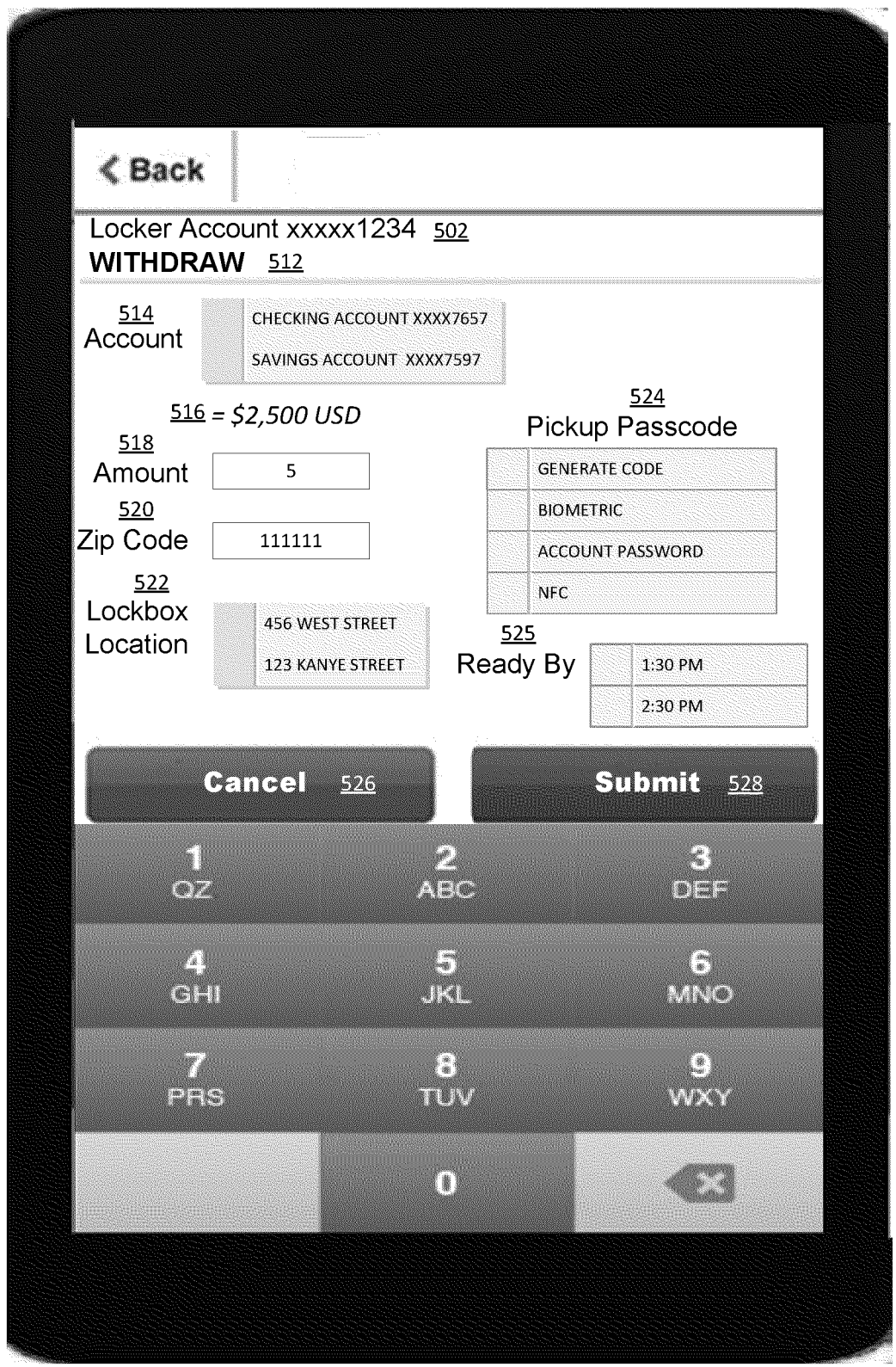

Referring now to FIG. 5B, a lockbox pickup service withdraw funds page 512 of the GUI 500 of FIG. 5A is illustrated. For example, the lockbox pickup service withdraw funds page 512 is displayed in response to a customer selection of the withdraw button 504 on the menu bar provided in FIG. 5A. The lockbox pickup service withdraw funds page 512 provides the customer a plurality of fields to easily facilitate receiving currency, identify type and denominations of currency, and a lockbox pickup at a lockbox location. According to an embodiment, the lockbox pickup service withdraw funds page 512 includes a source account field 514, a source account balance field 516, an amount field 518, a zip code field 520, a lockbox location field 522, a pickup passcode field 524, and a ready by field 525.

The source account field 514 defines which account the customer would like to use to complete the transaction. This could be, for example, the checking account for which the customer would like the withdrawn funds to be taken from. In some arrangements, the source account field 514 is defaulted to the account that was originally selected to begin the lockbox pickup service transactions, for example the specific fiat currency financial account 502 as shown in FIG. 5A. The customer may change the source account fund to another fiat currency financial account with the provider, which may cause the specific fiat currency financial account 502 to update to the newly selected option.

The source account balance field 516 displays the amount of available funds in the selected account in the source account field 514. The source account balance field 516 will update, in real-time, the balance depending on the account selected by the customer. The amount field 518 displays how much the customer would like to use in the selected lockbox pickup transaction. For example, the customer selects to withdraw from the selected account 10 U.S.D. In some arrangements, the amount field 518 will only allow the customer to enter an amount less than or equal to the source account balance field 516. In some arrangements, when the customer selects the withdraw option and enters the amount of currency to be withdrawn, the customer gets an additional field that allows the customer to enter the denominations of each value of currency he or she would like. For example, if the customer requests to withdraw 30 U.S.D. from the checking account, an additional field may allow the customer to designate that he or she receives one ten dollar bill and one twenty dollar bill.

The zip code field 520 allows the customer to enter the zip code for the area in which he or she would like to find a provider lockbox location to complete the transaction. In some arrangements, the customer is able to enter a full address in the zip code field 520 to provide for more accurate location matching by the provider. The lockbox location field 522 is a drop down menu of all the lockbox locations within the customer entered zip code. In some arrangements, the lockbox location field 522 is updated in real-time, in response to the value entered in the zip code field 522. In other arrangements, the lockbox location field 522 updates in response to the customer entering in a desired pickup time in the field, at 525.

The pickup passcode field 524 allows the customer to choose which form of authentication to be used by the lockbox location on the subsequent lockbox pickup transaction by the customer. As shown in FIG. 5B, the customer may require that the provider email a one-time passcode to the customer's email address, that the customer provide a biometric sample, that the customer provide an multi-use account password, or that the customer be able to utilize near field communication to authenticate.

The ready by field 525 allows the customer to enter the date that the customer would like to complete the lockbox pickup transaction. In some arrangements, the lockbox location field 522 updates, in real-time, in response to the pickup date options displayed in the field 526. In some embodiments, the pickup date field 526 is a drop down option menu, the options responsive to the transaction type and selected lockbox location. In other arrangements, the customer may enter in the date, in some format, for example MM/DD/YYYY.

The customer may choose to approve the transaction displayed by selecting the "Submit" button 528, or the customer may cancel the transaction request via the "Cancel" button 526. In some embodiments, either selection leads to an additional confirmation prompt by the application, for example as shown in FIG. 5C.

Figure 5C:
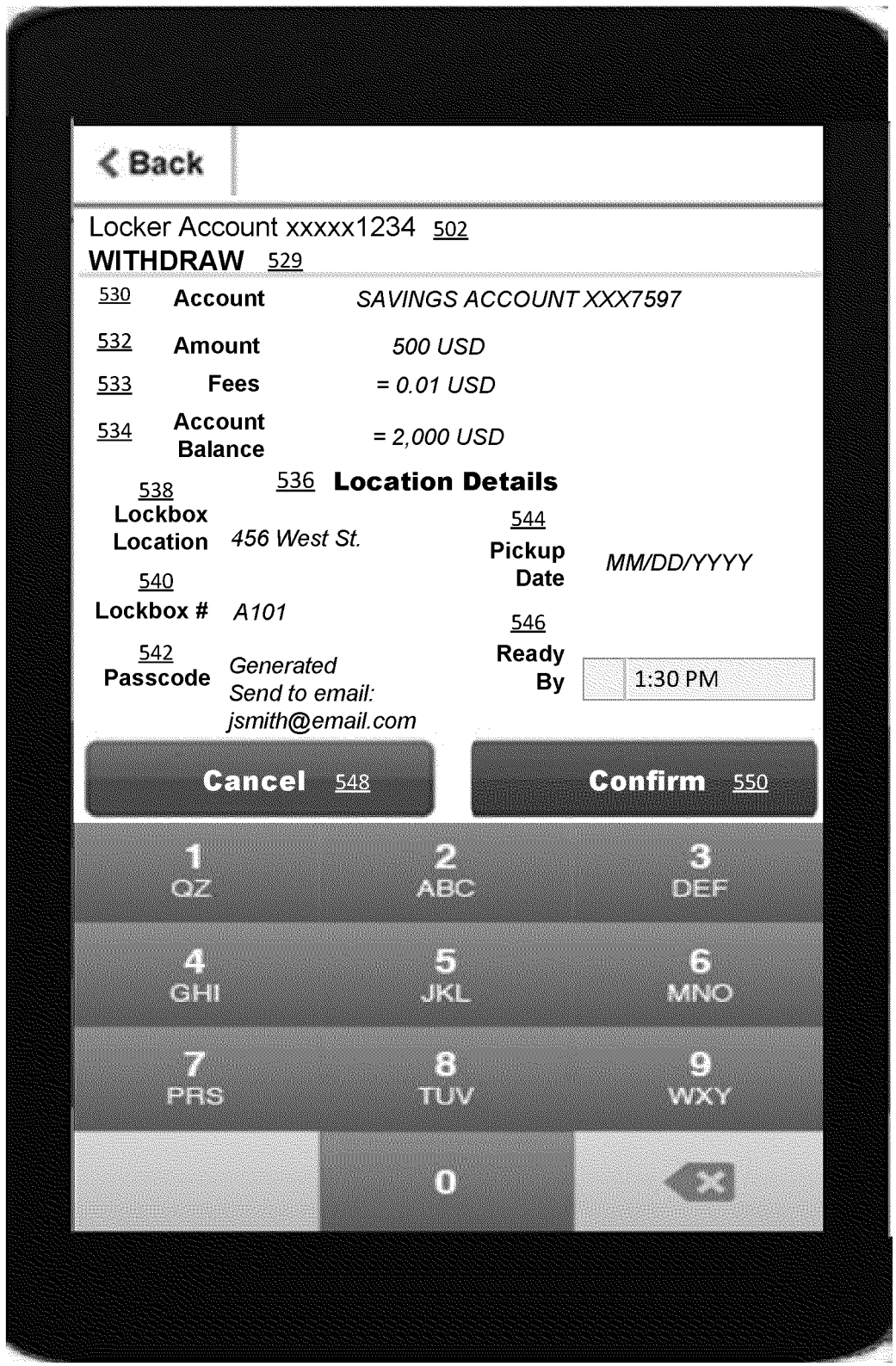

Referring now to FIG. 5C, a lockbox pickup service withdraw funds request summary page 529 of the GUI 500 of FIG. 5A is illustrated. For example, the withdraw funds request summary page 529 is displayed in response to a customer selection of the "confirm" button on the button bar provided in FIG. 5B. The withdraw funds request summary page 529 provides the customer a plurality of fields that summarize the details regarding the request submission, and reflects availability changes. According to an embodiment, the withdraw funds request summary page 529 includes a source account field 530, a transaction amount field 532, a fees field 533, a source account balance field 534, and a location details field 536.

The source account field 530, the transaction amount field 532 and the source account balance field 534 display the information entered into the withdraw funds page 512 as shown in FIG. 5B. The fees field 533 of the GUI 500 displays fees associated with the transaction. The fees may be associated with one or both of the provider and the MBC partner. The transaction amount field 532 is the total transaction amount in fiat currency that the customer's account will be debited upon executing the transaction. The total transaction amount may include the requested amount to be transmitted to the recipient, and also any fees associated with the transaction.

The location details field 536 includes the relevant information for the customer to arrive at the proper lockbox location and complete the transaction. The location details field includes a plurality of fields that summarize the location details and includes a lockbox location field 538, a lockbox number field 540, a passcode field 542, a pickup date field 544 and a ready by field 546. The lockbox location field 538 is a customer selected option from the drop down menu of all the lockbox locations within the customer entered zip code. The lockbox number field 540 is generated by the provider once the request has been received and approved. The lockbox number field 540 is the lockbox that the customer can access and complete the transaction. The passcode field 542 displays the customer's selection for the form of authentication to be used by the lockbox location on the lockbox pickup transaction. For example, the customer may have requested that the provider email a one-time password to the customer's email address, such as "jDoe@email.com" as shown in FIG. 5C.

The pickup data field 544 displays the customer's choice of the date that the customer would like to complete the lockbox pickup transaction. In some arrangements, the date is a result of the provider choosing the best date based on multiple date options selected by the customer in a previous menu. The pickup time field 546 displays the time at which the customer would like the lockbox to be ready to complete the transaction.

The customer may choose to approve the transaction displayed by selecting the "Confirm" button 550, or the customer may cancel the transaction request via the "Cancel" button 548. In some embodiments, either selection may lead to an additional confirmation prompt by the application.

Figure 5D:
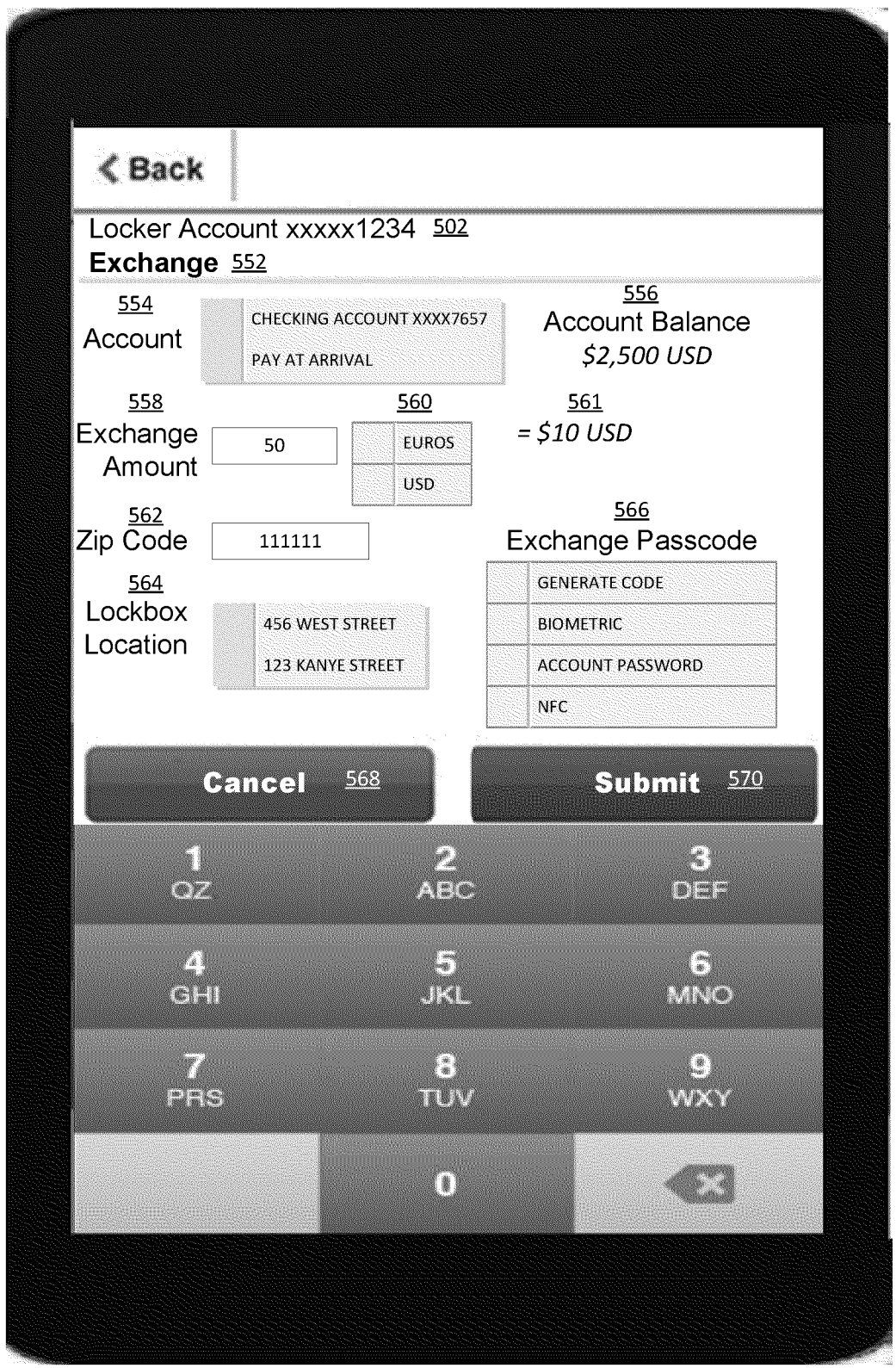

Referring now to FIG. 5D, a lockbox pickup service exchange funds page 552 of the GUI 500 of FIG. 5A is illustrated. For example, the lockbox pickup service exchange funds page 552 is displayed in response to a customer selection of the exchange button 508 on the menu bar provided in FIG. 5A. The lockbox pickup service exchange funds page 552 provides the customer a plurality of fields to easily facilitate receiving cash, lockbox pickup at a lockbox location. According to an embodiment, the lockbox pickup service exchange funds page 552 includes a source account field 554, a source account balance field 556, an exchange amount field 558, a foreign currency type 560, an equivalent amount field 561, a zip code field 562, a lockbox location field 564, and an exchange passcode field 566.

The source account field 554 defines which account the customer would like to use to complete the transaction. This could be, for example, the checking account for which the customer would like the exchange funds to be taken from. In some arrangements, the source account field 554 is defaulted to the account that was originally selected to begin the lockbox pickup service transactions, for example the specific fiat currency financial account 502 as shown in FIG. 5A. The customer may change the source account fund to another fiat currency financial account with the provider, which causes the specific fiat currency financial account 502 to update to the newly selected option. In some arrangements, the customer may select to pay for the exchange upon arrival at the lockbox location. For example, the customer could provide 100 U.S.D. in cash at the lockbox pickup location to the lockbox in exchange for the equivalent amount.

The source account balance field 556 displays the amount of available funds in the selected account in the source account field 502. The source account balance field 556 can update, in real-time, the balance depending on the account selected by the customer. The exchange amount field 558 displays how much the customer would like to use in the exchange currency lockbox pickup transaction. For example, the customer selects to exchange from the selected account 100 U.S.D. In some arrangements, the exchange amount field 558 will only allow the customer to enter an amount less than or equal to the source account balance field 556. In some arrangements, when the customer selects the exchange option and enters the exchange amount 558 of currency to be exchanged, the customer may get an additional field that allows the customer to enter the denominations of each value of currency he or she would like to end up with at the completion of the exchange. For example, if the customer requests to exchange 50 U.S.D. from the checking account for the equivalent amount of a foreign currency, for example euros, an additional field allows for the customer to designate that he or she receives five €2 coins.

The equivalent amount field 561 of the GUI 500 displays an amount in the customer's primary fiat currency (e.g., U.S.D.) that is equivalent to the amount of foreign currency requested in the exchange amount field 558 and the currency type in the currency type field 560. For example, as shown in FIG. 5D, if the U.S.D. amount in the amount field 558 is 50 U.S.D., the equivalent amount field 561 of the GUI 500 displays the amount of euro currency equivalent to the requested amount of U.S.D. In some arrangements where the customer selects to receive an amount of the foreign currency, the equivalent amount field 561 displays how much U.S.D currency is required to complete the exchange.

The zip code field 562 allows the customer to enter the zip code for the area in which he or she would like to find a provider lockbox location to complete the transaction. In some arrangements, the customer is be able to enter a full address in the zip code field 562 to provide for more accurate location matching by the provider. The lockbox location field 564 is a drop down menu of all the lockbox locations within the customer entered zip code. In some arrangements, the lockbox location field 564 is updated in real-time, in response to the value entered in the zip code field 562. In some arrangements, the lockbox location field 564 may be limited due to lockbox locations lacking the currency type that the customer wants to exchange the U.S.D. for. In other arrangements, the lockbox location field 564 updates in response to the customer entering in a desired pickup date and pickup time in provided fields (not pictured).

The customer may choose to approve the transaction displayed by selecting the "Submit" button 520, or the customer may cancel the transaction request via the "Cancel" button 518. In some embodiments, either selection may lead to an additional confirmation prompt by the application.

Figure 6:
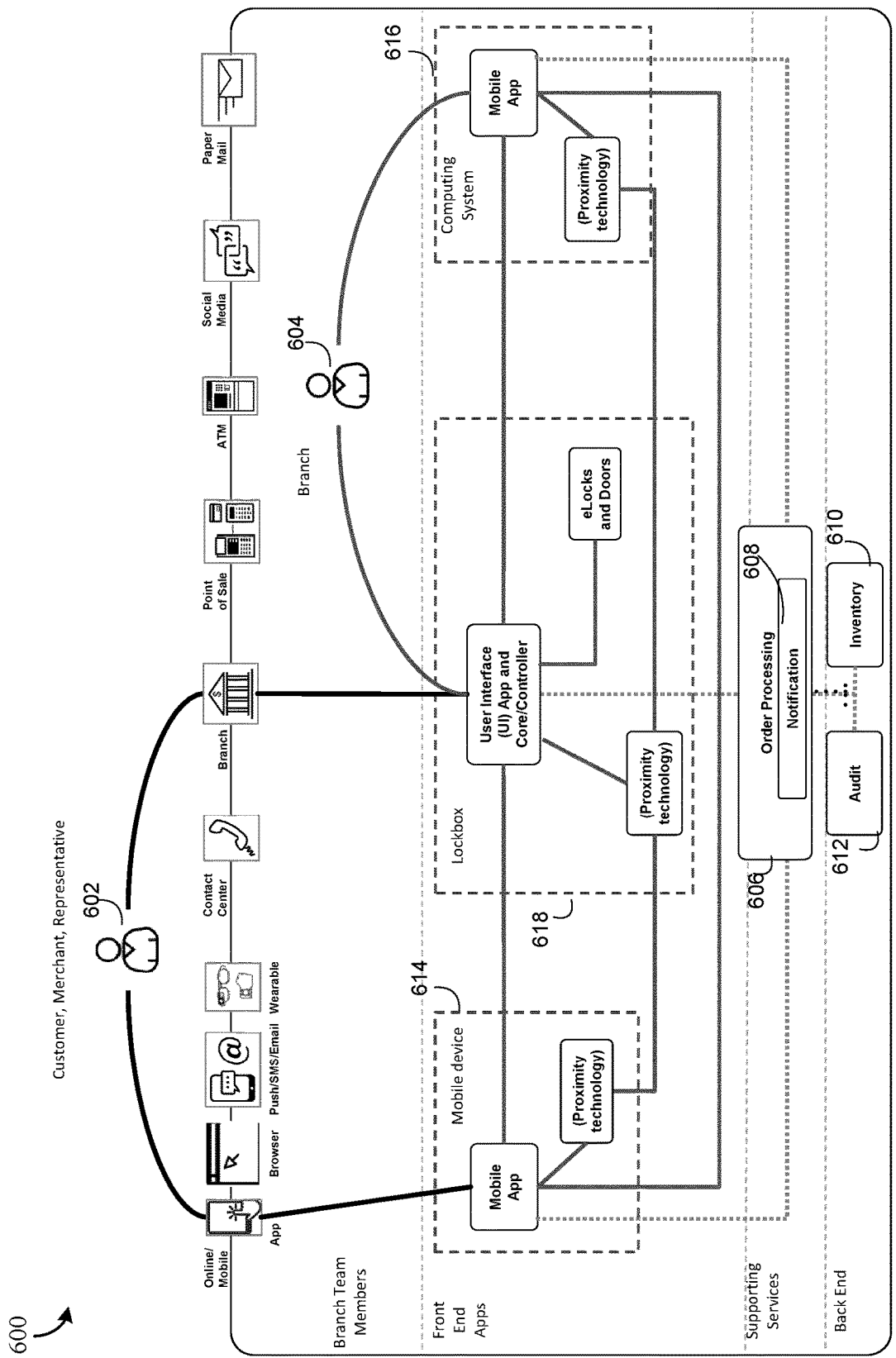
FIG. 6 is schematic diagram of a lockbox pickup transaction processing system, according to an example embodiment.

Referring to FIG. 6, schematic diagram of a lockbox pickup transaction processing system 600 is shown, according to an example embodiment. The lockbox pickup transaction processing system 600 facilitates order processing for a customer 602 placing a lockbox transaction request (e.g., order), order fulfilment (e.g., loading the lockbox, prepping the lockbox, etc.) for a provider branch 604 completing the lockbox transaction request, and order completion for when the customer 602 travels to the location to collect the order from the lockbox. The lockbox pickup transaction processing system 600 is shown in connection with a customer 602, a provider branch 604, a lockbox 618, and a lockbox pickup transaction processing system 600. The lockbox pickup transaction processing system 600 includes an order processing system 606, an audit system 612, an inventory system 610, and a notification system 608. The lockbox pickup transaction processing system 600 is in communication with a customer computing system 614, a lockbox 618, and a provider branch computing system 616. As will be appreciated, in addition to the description below, the lockbox pickup transaction processing system 600 can perform one or more of the features described above in connection with FIGS. 1-5D.

The lockbox pickup transaction processing system 600 is structured to overcome issues and pains with a customer (e.g., a business, merchant, etc.) receiving and depositing funds at a provider branch location 604. The lockbox pickup transaction processing system 600 provides a mechanism for "pre-ordering" or "pre-staging" a transaction before the customer—or authorized representative of the customer—arrives at the provider branch to 604 complete the transaction. As explained in greater detail below, the lockbox pickup transaction processing system 600 provides a digitally-based communication system that allows customers to specify a variety of transaction details, pick up locations, and pick up times (outside of regular banking hours), thereby bypassing provider branch customer lines and saving time and headaches associated with in-person transactions. Generally, the lockbox pickup transaction processing system 600 provides effortless mobile pre-staging, reduced wait times at branch location, and improved transaction status tracking.

The lockbox pickup transaction processing system 600 provides a user-friendly medium to facilitate orders, efficiency to generate transaction requests to provider branches, and a comprehensive notification system to aid the provider branch and customer throughout the transaction. In some arrangements, the lockbox pickup transaction processing system 600 includes a central hub operatively connected to a plurality of lockboxes. The central hub includes the lockbox location, unlock details, and authorization for each transaction associated with the plurality of lockboxes. The customer interacts with the central hub (through NFC, touchscreen, tactile strip, etc.) to provide unlock details and unlock the lockbox associated with the transaction of the customer 602. In other arrangements, each lockbox has a customer interaction interface (NFC, touchscreen, tactile strip, etc). The lockbox pickup transaction processing system 600, and arrangements described herein, provide significant technical advantages over conventional pick up transactions. For example, by digitizing the request, fulfilment, and pick up process, transaction time is significantly decreased compared to in-person based transaction. Further, the lockbox processing system provides users with increased functionality for placing transaction requests and authorizing entities for pickup.

By way of example, the customer 602 may be a convenience store that needs to retrieve multiple denominations of coins (e.g., coin boxes) and small bills (e.g., one, five, and ten dollar bills) to be collected quickly during the business day for facilitating transactions the following business day. Without the lockbox pickup transaction processing system 600, the customer 602 would have to arrive at the bank during normal (e.g., 9-5 pm, Monday-Friday) hours to deposit, withdraw, or exchange funds. The customer 602 would wait in line, speak to an employee at the provider branch, and then complete the transaction. As will be appreciated, the current method provides uncertain wait times, potential issues with availability of funds for withdraw or exchange, and inconvenient hours of operation by the provider branch. With the lockbox pickup transaction processing system 600, the customer 602 identifies a need for coins and small bills and enters the pickup transaction details on customer's 602 mobile device. The customer 602 received the pickup information and travels to the lockbox location at the customer's 602 convenience. Upon arrival, the customer does not have to talk to a teller or wait in the teller line as they are able to present the unlock authorization to the lockbox (or lockbox central hub), retrieve their currency, and leave the lockbox location.

In order for the customer 602 to use the lockbox pickup transaction processing system 600, the customer 602 must enroll one or more individuals and/or computing devices to be authorized to use the lockbox pickup transaction processing system 600. The customer 602 may be a person, a business entity, and so on. A customer 602 may authorize more than one user or device to engage in one or more features of the lockbox pickup transaction processing system 600. For example, the customer 602 may authorize three users: User A, User B, and User C, each with distinct user names and passwords. Each user has a distinct level of authorization to interact with the lockbox pickup transaction processing system 600; User A can place transaction requests of any amount and can collect the funds at the lockbox 618; User B can place transaction requests under 5,000 U.S.D. per day and can collect funds at the lockbox 618; User C cannot place transaction requests, but can collect funds at the lockbox 618. In other arrangements, the customer 602 may include three distinct associated computing systems, with each computing systems having a unique level of authorization to engage in one or more features of the lockbox pickup transaction processing system 600. Access through one of the computing devices provides the user of the computing device access to the lockbox pickup transaction processing system 600 in accordance with the associated level of authorization.

Once authorized, the customer 602 initiates a lockbox transaction request on the customer computing system 614. The lockbox transaction request occurs on a mobile application on the customer computing device 614 in communication with the order processing system 606 and provider branch computing system 616. The interface of the mobile application allows the customer to enter various details defining the parameters of a lockbox transaction request. For example, the transaction request includes a transaction type, a transaction amount, a lockbox location, a time window, a financial account to use to facilitate the transaction, and user(s) authorized to access the lockbox 618 to complete the transaction. As will be appreciated, one or more users may have access to unlock the lockbox 618 and complete the transaction. The transaction type can be a withdrawal, a deposit, a currency exchange, or any other similar transactions involving the physical passing of items (e.g., coins and bills). For example, the customer could request an exchange, wherein the customer provides 100 U.S.D. in a singles at a designated lockbox 618 transaction request at a lockbox location in exchange for the equivalent amount in ten 5 U.S.D. bills and four 20 U.S.D. bills. In some arrangements, multiple transaction types are requested in a single request.

While the customer 602 is entering the details into the customer computing device 614, the order processing system 606 is organizing and arranging possible lockbox locations and transaction details in response to the lockbox transaction request. In some embodiments, the communication of the lockbox location and time window can be determined by the order processing system 606 in real-time (i.e., the available lockbox locations on the user interface change, subject to availability) as the customer 602 enters in the details. For example, the customer 602 enters a currency exchange request and the order processing system 606 may only have two lockbox locations that could complete the transaction on the day of the request. Alternatively, the provider branch 604 may have no lockbox locations available for a transaction type for a given day, allowing the customer 602 to only select future days in the time window field. In other embodiments, the customer 602 submits a desired lockbox location and time window to the order processing system 606 and the customer 602 receives a transaction request approval with the details, or a transaction request denial due to unavailability at the lockbox location at the specified time window. The customer's 602 lockbox transaction request is finalized when a notification from the notification system 608 of the order processing system 606 is received detailing the completed lockbox transaction request. Additional notifications from the notification system 608 may be sent to the customer computing device 614 to provide updates, changes, and statuses of the lockbox transaction. For example, that the funds have been loaded into a lockbox 618 and are ready for retrieval.

From the customer's 602 perspective, a lockbox transaction request is submitted once an authorized user has logged onto an authorized customer computing device, entered in the lockbox transaction request details, approved the request details, and has received a notification of approval from a notification system 608 of the order processing system 606. Once submitted, the customer 602—or user authorized to complete the transaction at the lockbox location—travels to the lockbox 618 during the specified time window. Upon arrival, the customer 602 opens the locked lockbox 618 with the customer computing device 614. The lockbox 618 may be a user-interface display or be headless (e.g., no screen). Using near field communication ("NFC"), bar codes, QR codes, proximity technology, or a similar technology, the proximity of the customer computing device 614 to the correct lockbox 618 unlocks the lockbox 618 and allows for the customer 602 to complete the lockbox transaction. Various details of the lockbox transaction are captured and stored in the audit system 612 associated with the order processing system 606. The details may include, the time of the request, time of the pickup, media access control ("MAC") address of the requesting customer computing device 614, MAC address of the pickup customer computing device 614, transaction changes or failures, a recording of the pickup event, and the like. In some arrangements, the customer 602 may interact with a touchscreen or tactile strip to enter in the authorization information and unlock the lockbox.

On the provider branch 604 side, the provider branch computing device 616 receives the lockbox transaction request details from the notification system 608 of the order processing system 606. The order processing system 606 notifies, through the notification system 608, the provider branch 604 of the request details. This includes displaying the details on a provider branch computing system device 616. In some arrangements, each employee at the provider branch has a unique mobile computing device. The order processing system 606 not only determines which provider branch 604 to conduct the lockbox transaction request, but also which employee at the provider branch 604 should fulfill the transaction request. Similar to the customer side, the provider has one or more employees that have varying levels of authorization to fulfill or load a lockbox 618. For example, Employee A has access to unlock the lockbox and fulfill lockbox transactions of any amount; Employee B is authorized to complete transaction equal to or less than 6,000 U.S.D.; and Employee C only has access to retrieve deposited funds into the lockboxes. In some arrangements, the customer access information (e.g., the MAC address of the authorized pickup person, QR code, bar code, etc.) is loaded by an employee through the employee computing device. In other arrangements, the order processing system 606 provides the lockbox transaction details to the provider branch computing system 616, which in turn assigns the order to an employee at the provider branch 604.

In some arrangements, the details of the lockbox transaction request are displayed on a mobile computing device of an authorized employee of the provider branch 604. For example, employee John Smith may receive the transaction request and lockbox 618 to load with the correct currency and denominations on a tablet associated with his employee identifiers. The computing device associated with John Smith may be the device allowed to unlock the designated lockbox 618 and facilitate the transaction. The lockbox 618 may be unlocked by the employee using similar technology for facilitating unlocking by the customer computing device 614, for example, NFC, QR codes, bar codes, etc. Once the lockbox 618 is loaded, the employee completes the transaction request and a notification is sent to the customer computing device 614. The notification may come directly from the provider branch computing system 616 or by way of the notification system 608 of the order processing system 606. In some arrangements, the lockbox 618 is only accessible by the authorized customer(s) computing device 614 or an authorized employee at the provider branch 604. Upon completion (e.g., pickup, time window expiration, etc.) of the lockbox transaction request, a provider branch employee inspects the lockbox 618 after the transaction to ensure that it was carried out in accordance with the customer request or to retrieve the unclaimed funds. In some embodiments, a sensor is connected to the lockbox 618 to detect weight fluctuations throughout the duration of the lockbox transaction request. As will be appreciated, each part of the transaction request chain (e.g., assigned employee, assigned time, request completion time, etc.) is saved and stored in the audit system 612.

The order processing system 606 is structured to facilitate the back-end process necessary to conduct lockbox transaction request via the customer's financial account. The order processing system 606 includes a notification system 608, an inventory database 610, and an audit system 612. The order processing system 606 uses each of the systems 608, 610, 612 to receive a lockbox transaction request, determine a proper provider branch location and lockbox, generate transaction instructions to the provider branch 616, generate notifications to the customer 602 and the provider branch 604, and monitor the transaction chain/interactions. While the notification system 608, inventory database 610, and audit system 612 are shown separately, one or more functions of each system may be combined with other systems or joint systems to carry out the features of the lockbox pickup transaction processing system 600.

The order processing system 606 receives lockbox transaction request details from the customer computing device 614 and determines the viability and options for completing the request. The lockbox transaction request includes various details defining the parameters of a lockbox pickup transaction. For example, the transaction request includes a transaction type, a transaction amount, a lockbox location, a time window, and a financial account to use to facilitate the transaction. The transaction type can be a withdrawal, a deposit, a currency exchange or any other similar transactions involving the physical passing of items (e.g., coins and bills). For example, the customer could request an exchange, wherein the customer provides 500 U.S.D. at a designated lockbox 618 at a lockbox location in exchange for the equivalent amount in pesos. In some arrangements, multiple transaction types are requested in a single request. In some embodiments, the lockbox location and time window can be determined by the order processing system 606 in real-time (i.e., the available lockbox locations on the user interface change, subject to availability) as the customer enters details into the customer computing device 614. For example, the customer enters a currency exchange request and the order processing system 606 may only have three lockbox locations that could complete the transaction on the described day of the pickup. Alternatively, the provider branch 616 closest to the customer 602 may have no lockbox locations available for a transaction type for a given day, allowing the customer to only select future days in the time window field. In other embodiments, the customer submits a desired lockbox location and time window to the order processing system 606 and the customer receives a transaction request approval with the details, or a transaction request denial due to unavailability at the lockbox location at the specified time window.

The order processing system 606 is connected to an inventory database 610 that includes the inventory of funds (e.g., amount available, denominations, etc.) of each provider branch 604 connected to the lockbox pickup transaction processing system 600. If a provider branch 604 has insufficient funds or denominations to complete a transaction request, the order processing system 606 may instruct an employee of the customer 602 selected provider branch 604 to travel to a nearby provider branch and retrieve the requisite funds to bring to the customer 602 selected provider branch 604. The inventory database 610 tracks funds as they are debited (e.g., placed in the lockbox 618 but not collected) and relinquished (e.g., collected from the lockbox by an authorized customer 602) in order to facilitate accurate transaction request details.

The notification system 608 is structured to send notifications to the customer computing device 614 or the provider branch computing device 616. The notifications to the customer computing device 614 can include delays in servicing of the request, transaction request confirmation details, upcoming expiration of the time window, pickup reminders, and the like. The customer may receive the details the next time he or she logs into the customer account, or it may be retrieved instantaneously through push notifications tied to the mobile application associated with the lockbox pickup transaction processing system 600.

An audit inventory 612 includes lockbox transaction details to document each step/process of the transaction, thereby providing an audit trail for potential transaction disputes or discrepancies. In some arrangements, cameras may be placed both inside of the lockbox 618 and in the surrounding area such that transactions can be monitored. In some embodiments, the camera is not triggered until the customer 602 unlocks the lockbox 618. In other arrangements, the camera is constantly monitoring the location and the lockboxes 618. The video captured by the camera during the transaction is parsed out and sent to the audit system 612 along with the completed transaction details. Additionally, camera footage is captured during the loading of the lockbox 618 by the branch employee. In some arrangements, a camera on the provider branch computing device 616 of the employee is used to capture the process of loading the lockbox 618. For example, the employee may initiate a real-time video feed remotely with another employee to watch and validate the loading process. Alternatively, the employee may take a self-video of the process on the provider branch computing device 616 and save it to the audit system 612.

While the lockbox pickup transaction processing system 600 is described in connection with transactions related to funds transfers, the lockbox pickup transaction processing system 600 can be used to facilitate property transfers or other interactions involving the provider branch 616. For example, at the completion of the final payment of a mortgage, the customer 602 may request the deed to the real property be placed in a lockbox 618 for pick up. Additionally, the lockbox pickup transaction processing system 600 can be used to facilitate after-hours (e.g., outside of the branch locations normal business hours) or "night drops." Further, the lockbox pickup transaction processing system 600 can be used to facilitate provider credit card, debit card, check drop offs, pickups, retrievals, etc.

Figure 7:
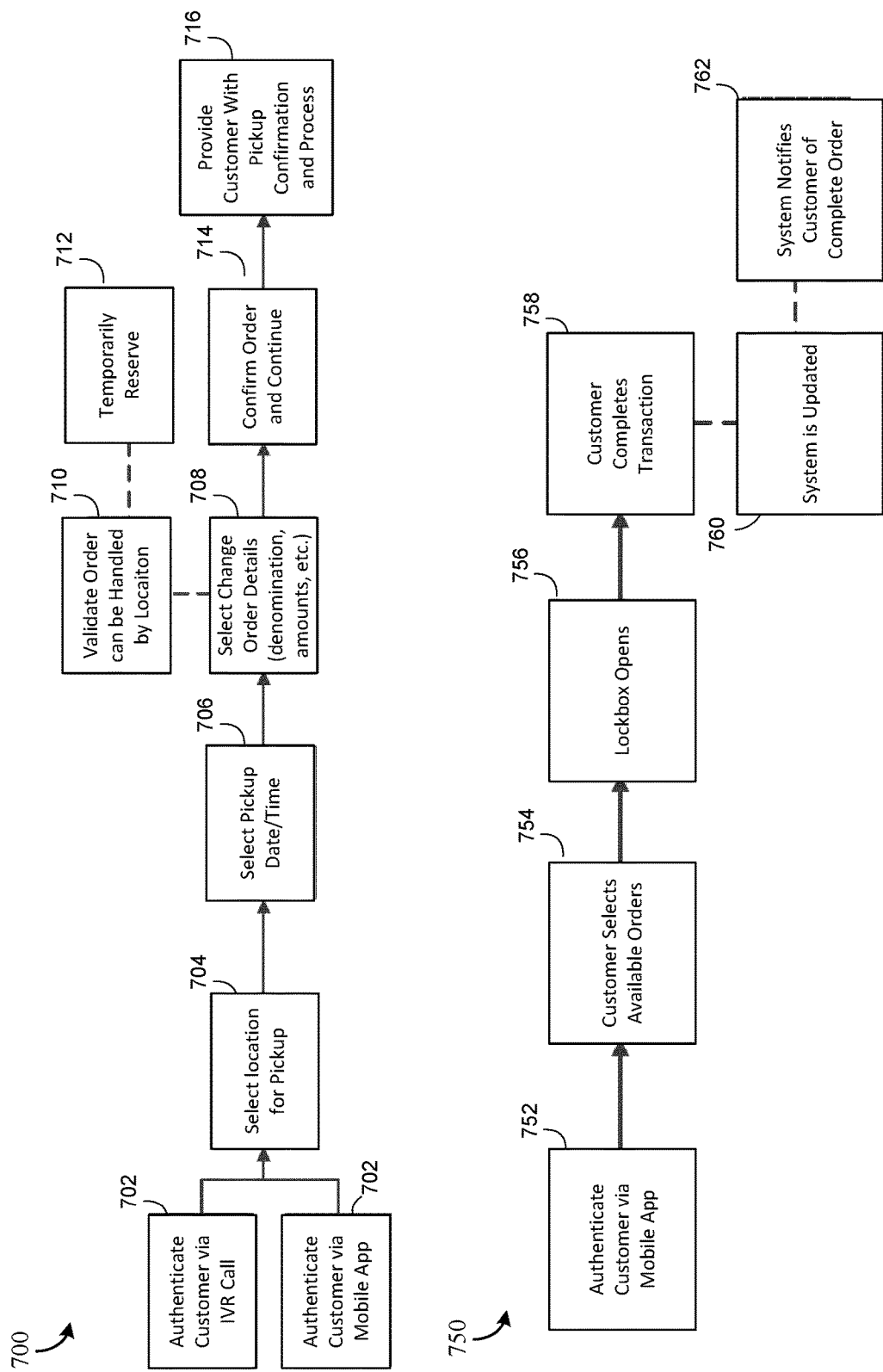
FIG. 7 is a flow diagram of a method of order processing and a method of order pick up from a user perspective, according to an example embodiment.

Referring to FIG. 7, a flow diagram of a method 700 of order processing and a method 750 of order pick up from a user perspective is shown, according to an example embodiment. The method 750 may be performed in conjunction with the method 700. The methods 700, 750 may be performed in connection with the lockbox pickup transaction processing system 600 of FIG. 6. However, the methods 700, 750 may similarly be performed in connection with other types of transactions and systems. The method 700 is shown in connection with a customer placing an order for a lockbox with a provider. The method 750 is shown in connection with retrieving an order from a lockbox with a provider. For example, the customer may be an individual who operates the customer computing system 614 of FIG. 6.

The lockbox location may be an entity that manages the lockbox 618 of FIG. 6. The provider may be a provider that manages the provider computing system 616 of FIG. 6. However, the methods 700, 750 may be similarly performed by other systems and devices. The methods 700, 750 may be performed in conjunction with the methods 800, 850 detailed below in FIG. 8.

The method 700 begins with the customer authenticating, via the customer's computing device with the lockbox pickup transaction processing system 100 at 702. The customer may be authenticated by an interactive voice response ("IVR") call or by logging into a mobile application on the customer's mobile computing device. In some arrangements, the customer has an authorization level associated with a degree (e.g., amount, frequency, etc.) of transactions possible. For example, the customer is authorized for deposit lockbox transactions of any amount, but may only initiate a withdrawal lockbox transaction of 5000 U.S.D. per week. In those arrangements, the lockbox pickup transaction processing system authenticates the authorization level of the customer and, depending on the result, one or more transaction details may be unavailable (e.g., pickup identifier) or limited (e.g., transaction amount).

At 704, the customer is presented with a GUI, or similar interface, on the customer computing device to select a location for pickup. The GUI may be similar to the GUI 500 of FIGS. 5A-5D. The selection of the location pickup can include entering a zip code for the area in which the customer would like to find a lockbox location to complete the transaction. The lockbox pickup transaction processing system determines available lockboxes in the desired location of the customer. In some arrangements, the customer may select one or more persons "authorized" pickup who are authorized on behalf of the customer to pick up the funds or items from the lockbox. The selection could include providing a previously enrolled identifier of an authorized pickup person or entering contact information of a computing device or account (e.g., email, phone number, etc.) associated with a person authorized to pick up the lockbox transaction order.

At 706, the customer enters the desired pickup time and date for the lockbox transaction request on the customer computing device. In some arrangements, the pickup date can be presented in a drop down option menu or the customer may enter in the date, in some format, for example MM/DD/YYYY. If the customer does not find a desired date or time, the customer may change locations to a lockbox location that has more availability. The time is a window for which the lockbox will be prepped and ready to complete the transaction request. The available time window may vary from lockbox location, for example, with lockbox locations in more populated areas having shorter time windows to account for the greater number of lockbox requests. Alternatively, the lockbox pickup transaction processing system may provide alternative lockbox locations or date and times depending on the customers data entry and availability.

At 708, the customer enters the lockbox transaction request details on the customer computing device. The details include, a type of transaction, a source account, an transaction amount, denominations of the amount. The type of transaction includes a deposit, withdrawal, exchange, deposit and withdrawal, pickup, or related transaction. The source account is the account the customer would like to use to complete the transaction. This could be, for example, the checking account from which the customer would like the funds to be withdrawn from. The customer may change the source account fund to another financial account with the provider. In some arrangements, the available funds in the source account are displayed to the customer to facilitate the transaction. The transaction amount is the amount the customer would like to use in the selected lockbox pickup transaction or the amount being deposited. For example, the customer selects to withdraw from the selected account 250 U.S.D. The denomination is the value of each currency the customer would like. For example, if the customer requests to withdraw 300 U.S.D. from the checking account, an additional field may allow the customer to designate that he or she receives a portion of the amount as a variety of coins with varying denominations and the remaining amount as ten dollar bills and twenty dollar bills. In arrangements involving property transfers, the transaction amount is the desired documentation.

At 710, the lockbox pickup transaction processing system validates, in real-time, that the lockbox transaction request details are feasible. The lockbox pickup transaction processing system determines whether the provider branch associated with the desired lockbox location can handle the transaction at the desired date and time. This validation can include checking the inventory, the staffing and level of authorization, the available lockboxes, the hours of operation, and other details of the provider branch.

At 712, the lockbox pickup transaction processing system temporarily reserves the lockbox and transaction funds at the provider branch to ensure the funds and lockbox will not be allocated to a different transaction. The various interactions between debiting/crediting the customer account and the provider branch account are described in greater detail below in method 800 of FIG. 8.

At 714, the lockbox pickup transaction processing system generates and transmits an order confirmation to the customer computing device for approval. The customer may approve the lockbox transaction request details as presented, edit the request details, or cancel the request. Once approved, at 716, the lockbox pickup transaction processing system provides pickup confirmation details and pickup proves details to the customer computing device. In arrangements were one or more persons are authorized to pick up the lockbox, the lockbox pickup transaction processing system provides pickup confirmation details and pickup proves details to each person's respective computing device and/or account.

Method 750 begins when the customer—or authorized person for pickup—arrives at the lockbox location during the time window. The arrival time and location are in accordance with the pickup window provided by the lockbox pickup transaction processing system at 716 of method 700. At 752, the customer authenticates via the customer's mobile computing device. The authentication may include logging into a mobile application, selecting a link, code, or feature provided in the confirmation details, scanning a bar code or similar code at a lockbox terminal operably connected to the plurality of lockboxes at the location, activating NFC technology to communicate with the lockbox system, or similar authentication options.

In some arrangements, a customer may have multiple lockbox transaction requests pending at a lockbox location. In those arrangements, at 754, the customer may select one or more available lockbox transaction orders to complete.

At 756, the lockbox opens for the authenticated customer. In some arrangements, each lockbox includes a display panel the customer can engage, either through the customer's mobile computing device or through a touch screen on the lockbox, to authenticate the customer and unlock the lockbox.

At 758, the customer completes the lockbox transaction. The customer may remove, add, or remove and add funds or other items depending upon the transaction request type. In some arrangements, the customer records the transaction on the customer computing device through the customer computing device for verification purposes. In other arrangements, the provider branch records the completion of the transaction and uploads the footage to an audit system. In some arrangements, the lockbox includes a weight sensor that tracks the fluctuations in weight distribution in the lockbox.

At 760, on the back-end (e.g., not in view of the customer) the lockbox pickup transaction processing system updates the inventory database, audit database, and the provider branch computing system to reflect the completed lockbox transaction request. If the lockbox transaction was a withdrawal, the lockbox pickup transaction processing system assigns the lockbox to the available pool of lockboxes to accommodate subsequent lockbox transaction requests. If the lockbox transaction request was a deposit or exchange, the lockbox pickup transaction processing system re-locks the lockbox and generates instructions to the provider branch computing system to unload the lockbox. The lockbox pickup transaction processing system will re-lock the lockbox such that the customer does not have access to the lockbox, but one or more employees can access the lockbox.

At 762, the lockbox pickup transaction processing system generates a completed transaction details message and transmits it to the customer computing device. The notification includes an update to any adjustment of the customer's financial account in view of the completed transaction.

Figure 8:
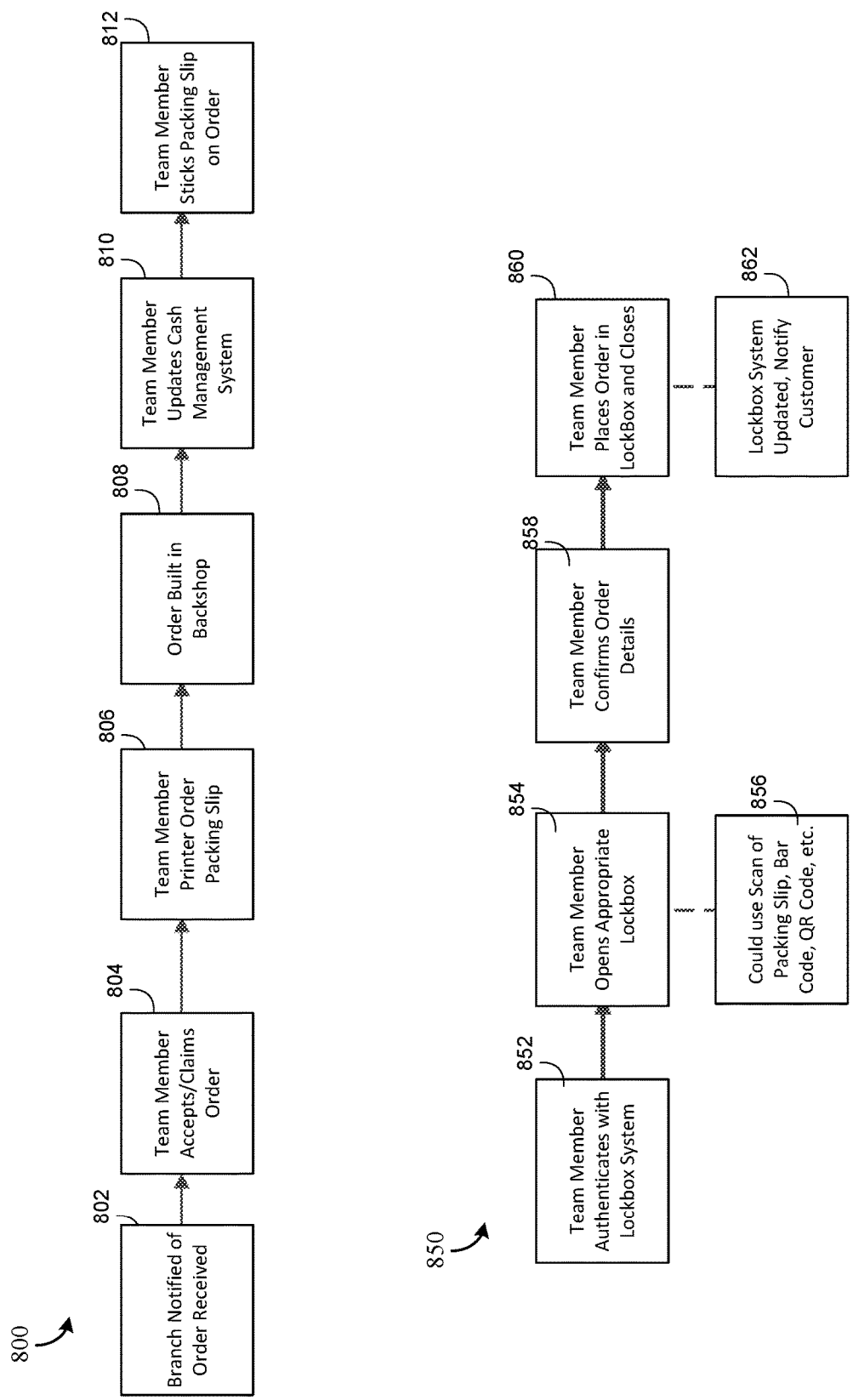
FIG. 8 is a flow diagram of a method of order processing and a method of lockbox set up from a provider branch perspective is shown, according to an example embodiment.

Referring to FIG. 8, a flow diagram of a method 800 of order processing and a method 850 of lockbox set up from a provider branch is shown, according to an example embodiment. The method 850 may be performed in conjunction with the method 800. The methods 800, 850 may be performed in connection with the lockbox pickup transaction processing system 600 of FIG. 6. However, the methods 800, 850 may similarly be performed in connection with other types of transactions and systems. The method 800 is shown in connection with a provider branch processing an order for a lockbox with a provider. The method 850 is shown in connection with loading (e.g., setting up, prepping, etc.) an order for a lockbox with a provider. For example, the customer may be an individual who operates the customer computing system 614 of FIG. 6. The lockbox location may be an entity that manages the lockbox 618 of FIG. 6. The provider may be a provider that manages the provider computing system 616 of FIG. 6. However, the methods 800,850 may be similarly performed by other systems and devices. The methods 800,850 may be performed in conjunction with the methods 700, 750 detailed above in FIG. 7.

The method 800 begins when the provider branch computing system is notified of a lockbox transaction request (e.g., order) by the lockbox pickup transaction processing system at 802. If the provider branch employees are assigned computing devices, the lockbox pickup transaction processing system can send the instructions directly to the computing device associated with the employee. Employees are assigned lockbox requests to process by the lockbox pickup transaction processing system in accordance with the employee's authorization level. In some arrangements, all employees are authorized to handle any lockbox order. In other arrangements, employees have tiered authorization levels that allow them to process lockbox transaction requests less than a determined tier amount. For example, new employees may be unauthorized to process orders greater than 5000 U.S.D. for a period of time, whereas a five year employee is unauthorized to process orders greater than 50,000 U.S.D. In some arrangements, the lockbox pickup transaction processing system transmits requests to the provider branch computing system which, in turn, assigns the orders to branch employees.

At 804, the provider branch employee (e.g., team member) accepts the order transmitted to the team member's computing device. The team member may be required to select additional options in accepting the order, for example, selecting when the team member anticipates completing the order, acknowledgement of the steps associated with completing the order, initiating a recording feature on the computing device, etc.

At 806, the team member prints the order details onto a packing slip to provide with the order in the lockbox. The packing slip may assist the team member in completing the order processing. In some arrangements, instead of printing a packing slip, the team member may display the order details on a mobile computing device and an electronic packing slip is sent to the customer computing device.

At 808, the order is prepared in accordance with the order details. By way of example, in a withdrawal the request amount and denominations are organized and placed in a receptacle (e.g., rubber band, rolled coin container, bag, etc.); in a deposit a receiving receptacle is prepared; in a property transfer the documentation is prepared (e.g., signed, reviewed, etc.) and placed in a receptacle. In some arrangements, a different team member is tasked with organizing the order.

At 810, the team member updates the cash management system (or similar system) for the provider branch in view of the order details. In some arrangements, a transaction is "complete" once it is built by the team member. In these arrangements, credit is allocated for funds removed from the cash management system, or in other words, to satisfy a withdrawal order. The cash management system is debited and the customer account is temporary debited. Once the funds are collected, the customer's account is debited and the cash management system is credited. If no funds are collected or the order is canceled, the funds are removed and the cash management system and the customer account are credited. In other arrangements, a suspense account is used to facilitate all withdrawal lockbox transactions. A suspense account is debited when the withdrawal order is processed and credited when funds are collected by the customer, thereby causing the customer account to be debited. In other arrangements, the customer account, and not the cash management system, is debited when the order is built at 808.

At 812, the team member places the packing slip on the order bag or receptacle and the order is ready to be loaded into the lockbox.

The method 850 begins when a team member authenticates on the lockbox system at 852. The authentication process includes the team member having the requisite authorization to interact with one or more lockboxes of the lockbox system. In some arrangements, the authentication process is a team member logging in with a username and password to gain access through a mobile computing device.

At 854, the team member opens the lockbox assigned to the order. In some arrangements, the team member interacts with a central hub connected to the lockbox system. The lockbox associated with the order details is opened by providing the correct order details (e.g., an order code, a unique access code, a bar code, a NFC with the assigned team member mobile computing system, etc.) to the central hub. In other arrangements, the team member interacts with the lockbox directly providing the correct order details (e.g., an order code, a unique access code, a bar code, a NFC with the assigned team member mobile computing system, etc.) to the lockbox to gain access. In some arrangements, the packing slip on the receptacle is scanned (e.g., bar code, QR code, etc.), at 856, thereby causing the lockbox to open.

At 858, the team member confirms the order details before loading the lockbox. This includes ensuring the receptacle, amount, package slip, lockbox number, pickup day, and pickup time window are correct. In some arrangements, certain lockboxes are configured to handle specific transactions (e.g., withdrawal, deposit, both, exchange, etc.). Accordingly, the team member would confirm the proper lockbox was being used for the order.

At 860, the team member places the order in the lockbox and closes the lockbox. In some arrangements, the lockbox is only accessible to the customer during the order window and accessible only to a team member at the conclusion of the order window or if the customer cancels the order. In other arrangements, one or more team members (e.g., branch manager) can access the lockbox at any time.

At 862, the lockbox pickup transaction processing system is updated and the transaction processing system generates an "order ready" message and transmits it to the customer computing device. The notification includes an update to any adjustment of the customer's financial account or order details in view of the upcoming transaction. In some arrangements, the notification includes a link to cancel or edit the order in the lockbox. Alterations to the order while in the lockbox may cause the lockbox pickup transaction processing system to give access to a team member to unlock the lockbox and alter the order in accordance with the changes.

Figure 9:
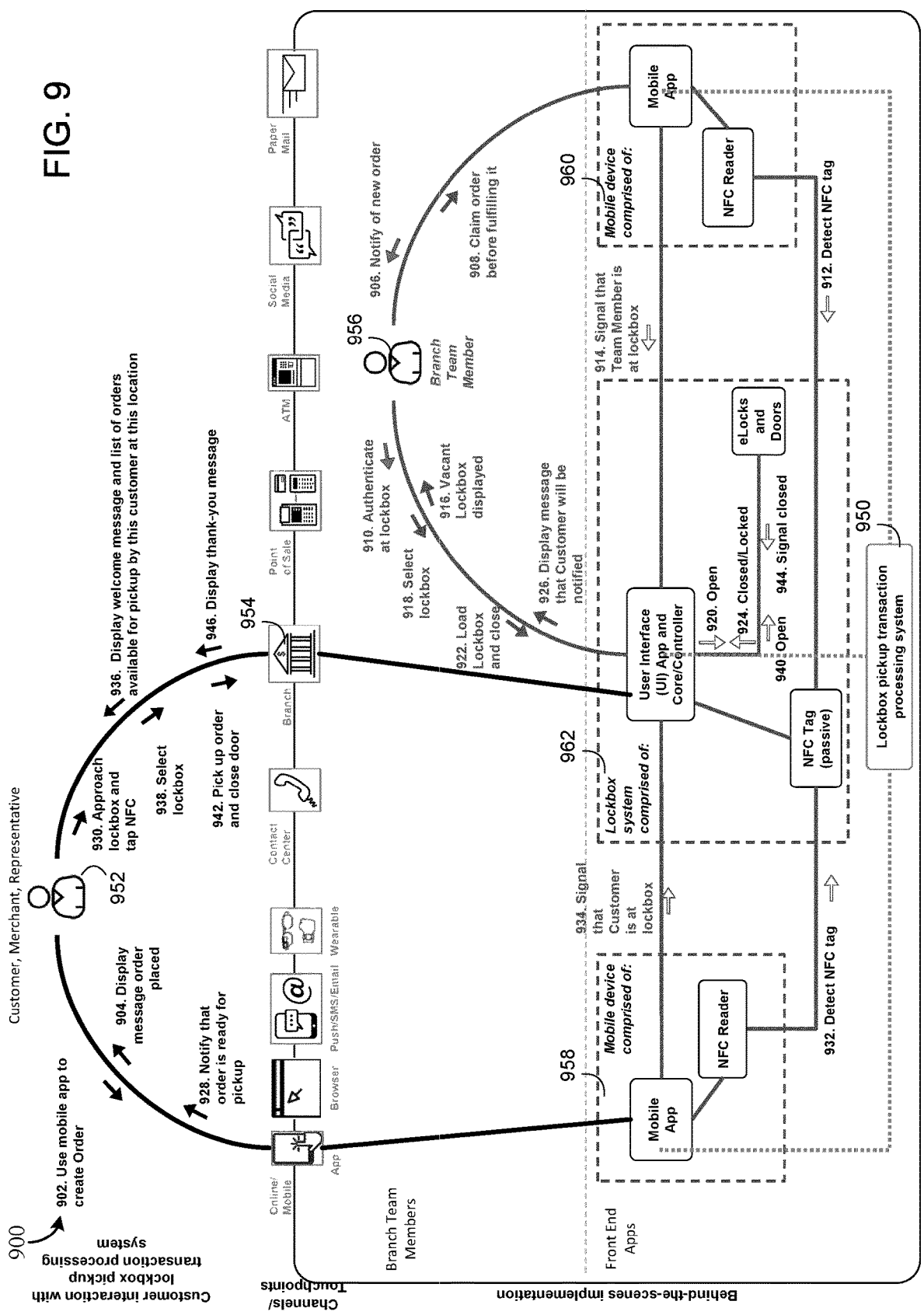
FIG. 9 is a flow schematic diagram of a method of receiving and completing a lockbox pickup transaction request with a lockbox pickup transaction processing system, according to an example embodiment.

Referring to FIG. 9, a flow schematic diagram of a method 900 of receiving and completing a lockbox pickup transaction request with a lockbox pickup transaction processing system 950 is shown, according to an example embodiment. As shown in FIG. 9, a lockbox pickup transaction processing system 950 facilitates the order request and completion between a customer 952 on a customer computing device 950 and a provider branch 954 that includes a lockbox system 962. On the provider branch 954 end, the lockbox pickup transaction processing system 950 generates instructions for a mobile device 960 associated with a branch team member (e.g., employee) 956. The method 900 can include one or more aspects or arrangements described above in relation to FIGS. 1-8.

The method 900 begins when the customer 952 places an order places a lockbox transaction request (e.g., order) at 902. The customer 952 places the order by authenticating with a mobile application on the customer mobile device 958 in communication with the lockbox pickup transaction processing system 950. The customer 952 enters the order details and confirms the transaction. The ordering process may be similar to method 700 of FIG. 7.

At 904, the customer 952 receives a message confirming the order on the display of the customer mobile device 958 from the lockbox pickup transaction processing system 950. The information may include order details, pickup location, pickup instructions, and lockbox access details.

At 906, the lockbox pickup transaction processing system 950 transmits a notification of the order to the mobile device 960 of a branch team member 956. The assignment of the order to the branch team member 956 may be dependent on the authorization of the team members, availability of the team members, order details, etc. At 908, the branch team member 956 accepts the order and claims it. Once claimed, the lockbox pickup transaction processing system 950 associates the order with the branch team member 956 and allows the mobile device 960 of the branch team member 956 to access an NFC tag in the assigned lockbox.

At 910, the branch team member 956 has prepped the order and arrives at the lockbox system 962 to authenticate. In this arrangement, the lockbox system 962 includes a central controller or application (e.g., user interface) that is connected to a plurality of lockboxes. The branch team member 956 can interact with the user interface to authenticate and gain access to the assigned lockbox.

At 912, the NFC reader in the mobile device 960 detects the NFC tag on the assigned lockbox in the lockbox system 962. At 914, a mobile application on the mobile device 960 communicates to the lockbox system 962 that an authorized branch team member is at the assigned lockbox.

At 916, the vacant, assigned lockbox is displayed on the user interface to the branch team member 956. At 918, the branch team member 956 selects the vacant, assigned lockbox. The display and selection of the lockbox occurs on a user interface on the lockbox system 962. In other arrangements, the display and selection of the lockbox are pushed to a mobile application on the mobile device 960.

At 920, the assigned lockbox in the lockbox system 962 opens. At 922, the branch team member 956 loads the lockbox with the contents, according to the order details, and closes the lockbox. At 924, the lockbox system 962 recognizes the closing of the lockbox and locks the lockbox.

At 926, a message is provided to the branch team member 956 that the customer 952 will be notified that the lockbox pickup is ready. This notification can be displayed on a user interface on the lockbox system 962 or on the mobile device 960 of the branch team member 956.

At 928, the lockbox pickup transaction processing system 950 transmits a notification to the customer mobile device 958 indicating the lockbox is ready for pickup. The notification may be "pushed" to be displayed on the customer mobile device 958, it may be presented the next time the customer 952 logs in, or it may be sent to an account (e.g., email, text, etc.) associated with the customer 952.

At 930, the customer travels to the provider branch 954 and approaches the plurality of lockboxes in the lockbox system 962. At 932, the NFC reader in the customer mobile device 958 detects the NFC tag on the assigned lockbox in the lockbox system 962. At 934, a mobile application on the customer mobile device 958 communicates to the lockbox system 962 that an authorized customer is at the assigned lockbox to complete the order.

At 936, the loaded, assigned lockbox is displayed on the user interface to the customer 952. If the customer 952 has multiple orders outstanding the customer 954 may select one or more orders to complete. At 938, customer 952 selects the assigned lockbox from the user interface. In some arrangements, the display and selection of the lockbox occurs on a user interface on the lockbox system 962. In other arrangements, the display and selection of the lockbox are pushed to the mobile application on the customer mobile device 958.

At 940, the assigned lockbox in the lockbox system 962 opens. If more than one lockbox was selected at 936, those lockboxes will open as well. At 942, the customer 952 unloads the contents from the lockbox and closes the lockbox. At 944, the lockbox system 962 recognizes the closing of the lockbox and locks the lockbox. At 946, a thank-you message with the completed order details is displayed to the customer 954. This display can occur on a user interface on the lockbox system 962 or on the mobile application on the customer mobile device 958.

Figure 10:
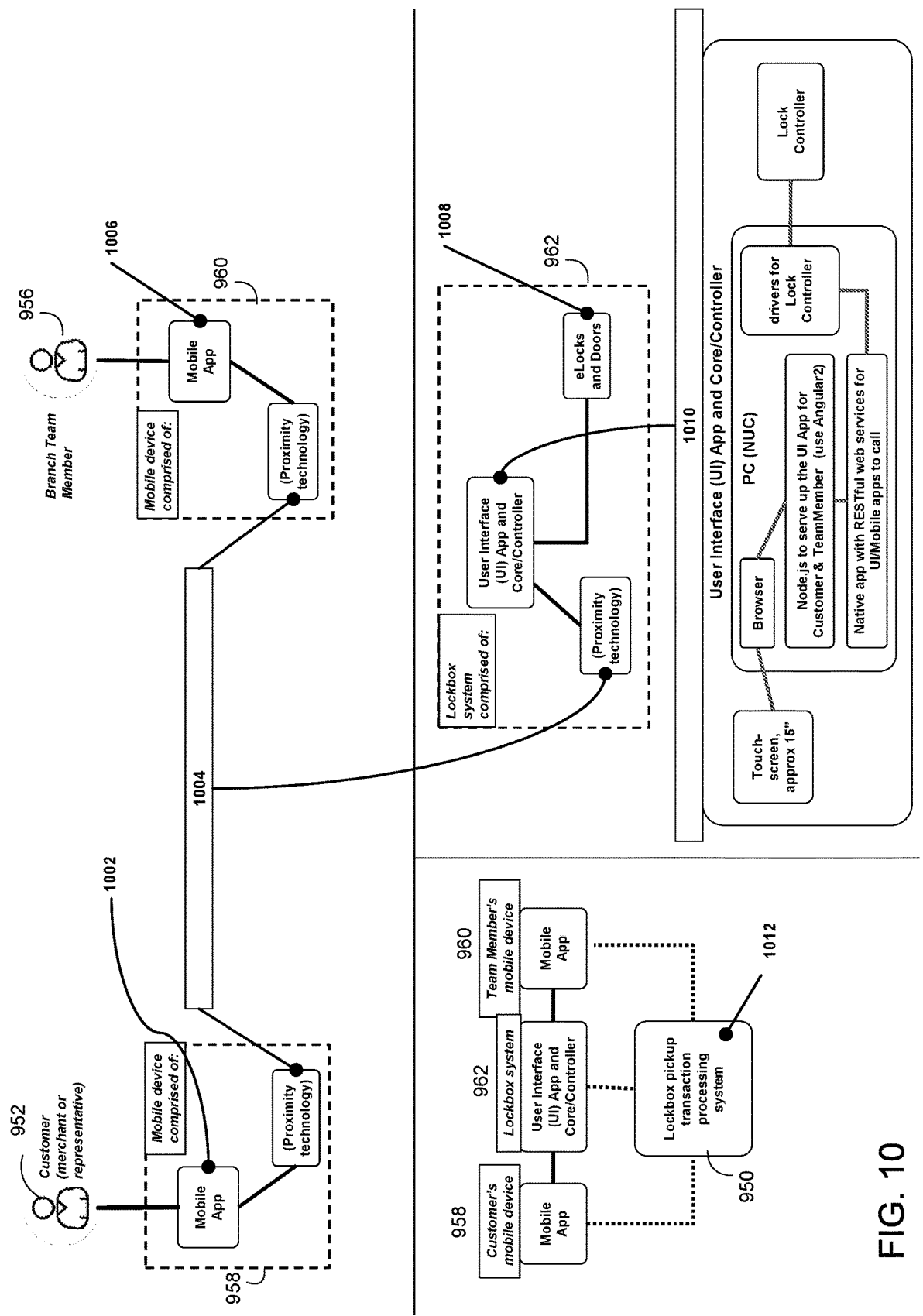
FIG. 10 is a schematic diagram of the lockbox pickup transaction processing system of FIG. 9.

Referring to FIG. 10, a schematic diagram of the lockbox pickup transaction processing system of FIG. 9 is shown. FIG. 10 provides an arrangement detailing components of the lockbox pickup transaction processing system 950 shown in FIG. 9. As will be appreciated, one or more software components or features may be altered in various arrangements. As shown in FIG. 10, the customer mobile device 958, the mobile device 960, and the lockbox system 962 are in communication with the lockbox pickup transaction processing system 950. The communication interface 1012 between the lockbox pickup transaction processing system 950 and the customer mobile device 958, the mobile device 960, and the lockbox system 962 can be Node.js server application and MongoDB. The customer mobile device 958 and the mobile device 960 can interact with the lockbox system 962 using RESTful web services. Alternatively, the customer mobile device 958 and the mobile device 960 can interact with the lockbox system 962 using Bluetooth™ or similar proximity-based communications.

The customer mobile device 958 includes a mobile application 1002 and proximity technology 1004. The mobile technology includes iOS™, Android™, or other mobile application software. The mobile application 1002 may be integrated with APIs to an existing provider-based mobile application. The proximity technology 1004 includes utilizing passive NFC tags on the lockboxes that are detectable by the proximity technology 1004, the lockbox system 962 including a NFC reader and/or writer to communicate with the mobile devices 958, 960, or proximity beacons (e.g., ProxtoMe™) to communicate.

The mobile device 960 includes a mobile application 1006 and proximity technology 1004. The mobile technology includes iOS™, Android™, or other mobile application software. The mobile application 1006 may be integrated with APIs to an existing provider-based mobile application. In one arrangement, the mobile application 1006 is an Angular2 web application within a native Windows™ wrapper application. The proximity technology 1004 includes utilizing passive NFC tags on the lockboxes that are detectable by the proximity technology 1004, the lockbox system 962 including a NFC reader and/or writer to communicate with the mobile devices 958, 960, or proximity beacons (e.g., ProxtoMe™) to communicate.

The lockbox system 962 includes electronic locks (eLocks) 1008, a user interface 1010, and proximity technology. The eLocks 1008 includes separate wires to trigger the locking mechanism and detecting open and closed states of the lockboxes. Alternatively, the eLocks may utilize 1-Wire technology. The lockboxes may be 9" cube modules. The proximity technology 1004 includes utilizing passive NFC tags on the lockboxes that are detectable by the proximity technology 1004, the lockbox system 962 including a NFC reader and/or writer to communicate with the mobile devices 958, 960, or proximity beacons (e.g., ProxtoMe™) to communicate. The user interface 1010 includes an interface to properly display communications between the lockbox pickup transaction processing system 950, the customer mobile device 958, and the mobile device 960 with the lockbox system 962.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Etherium, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
    receiving, by a financial institution computing system of a financial institution, a lockbox transaction request from a user device associated with an account holder of the financial institution, the lockbox transaction request including a transaction identification and a transaction location;
    identifying, by the financial institution computing system, a physical transaction lockbox from a plurality of physical lockboxes associated with the financial institution based on the transaction identification and the transaction location, the plurality of physical lockboxes comprising a first physical lockbox configured to dispense a withdrawal amount of currency and a second physical lockbox configured to receive a deposit amount of currency and configured to identify a currency type and currency number of the deposit amount of currency;
    transmitting, by the financial institution computing system, a lock request to the physical transaction lockbox, wherein the physical transaction lockbox is the first physical lockbox when the transaction identification is a withdrawal and wherein the physical transaction lockbox is the second physical lockbox when the transaction identification is a deposit;
    configuring, by the financial institution computing system, the physical transaction lockbox based on the transaction identification, wherein configuring the physical transaction lockbox comprises operating a locking mechanism to physically lock the physical transaction lockbox; and
    transmitting, by the financial institution computing system, transaction information to the user device, wherein the transaction information includes a lockbox location, lockbox unlock information, and a lockbox number, the lockbox number being the physical transaction lockbox from the plurality of physical lockboxes, the lockbox unlock information being sufficient to unlock the physical transaction lockbox.

2. The method of claim 1, wherein the transaction identification is an exchange comprising a transaction deposit amount and a transaction withdrawal amount, wherein the lock request is a first lock request, wherein the physical transaction lockbox is the first physical lockbox, and wherein the lockbox number is a first lockbox number, further comprising, transmitting, by the financial institution computing system, a second lock request to the second physical lockbox, wherein the second physical lockbox is unlocked when the first physical lockbox receives the transaction deposit amount; and transmitting a second lockbox number, the second lockbox number being the second physical lockbox, wherein the lockbox unlock information is associated with unlocking the first physical lockbox.

3. The method of claim 1, wherein the transaction identification is an exchange comprising a transaction deposit amount and a transaction withdrawal amount, wherein the lock request is a first lock request, wherein the physical transaction lockbox is the first physical lockbox, and wherein the lockbox number is a first lockbox number, further comprising, transmitting, by the financial institution computing system, a second lock request to the second physical lockbox, wherein the first physical lockbox is unlocked when the transaction withdrawal amount is removed from the second physical lockbox; and transmitting a second lockbox number, the second lockbox number being the second physical lockbox, wherein the lockbox unlock information is associated with unlocking the second physical lockbox.

4. The method of claim 1, wherein the transaction identification is an exchange comprising a transaction deposit amount and a transaction withdrawal amount, wherein the lock request is a first lock request, wherein the physical transaction lockbox is the first physical lockbox, wherein the lockbox unlock information is a first lockbox unlock information, and wherein the lockbox number is a first lockbox number, further comprising:
    transmitting, by the financial institution computing system, a second lock request to the second physical lockbox; and
    transmitting, by the financial institution computing system, a second lockbox location, second lockbox unlock information, and a second lockbox number to the user device, the second lockbox number being the second physical lockbox from the plurality of physical lockboxes, and the second lockbox unlock information is associated with unlocking the first physical lockbox.

5. The method of claim 1, wherein the transaction identification is the withdrawal and the physical transaction lockbox is the first physical lockbox, further comprising, receiving, by the financial institution computing system from a mobile device, an unlock attempt;
    authenticating, by the financial institution computing system, the unlock attempt, wherein authentication occurs by comparing the unlock attempt to the lockbox unlock information and
    transmitting, by the financial institution computing system, an unlock command to the first physical lockbox based on the authentication, wherein unlocking the first physical lockbox provides the withdrawal amount of currency.

6. The method of claim 1, wherein the transaction identification is the deposit and the physical transaction lockbox is the second physical lockbox, further comprising, receiving, by the financial institution computing system from a mobile device, an unlock attempt;
    authenticating, by the financial institution computing system, the unlock attempt, wherein authentication occurs by comparing the unlock attempt to the lockbox unlock information; and
    transmitting, by the financial institution computing system, an unlock command to the second physical lockbox based on the authentication, wherein unlocking the second physical lockbox facilitates depositing the deposit amount of currency.

7. The method of claim 1, further comprising:
    transmitting, by the financial institution computing system, a potential lockbox location to the user device, after identifying the physical transaction lockbox from the plurality of physical lockboxes, and receiving, by the financial institution computing system, approval of the potential lockbox location from the user device, wherein the potential lockbox location is the lockbox location of the transaction information.

8. A computing system associated with a provider, the computing system comprising:
- an inventory database having information relating to the use and availability of a plurality of physical lockboxes at lockbox locations and the use and availability of an amount of currency and denominations of currency at the lockbox locations,
- the plurality of physical lockboxes comprising a first physical lockbox configured to dispense a withdrawal amount of currency and a second physical lockbox configured to receive a deposit amount of currency and configured to identify a currency type and currency number of the deposit amount of currency;
- a network interface configured to communicate data to and from a lockbox computing system associated with the provider and a user device associated with an account holder of the provider user over a network; and
- a lockbox management circuit structured to:
  - receive a lockbox transaction request from the user device, the lockbox transaction request including a transaction identification and a transaction location;
  - identify a physical transaction lockbox from the plurality of physical lockboxes associated with the provider based on the transaction identification and the transaction location;
  - transmit a lock request to the physical transaction lockbox, wherein the physical transaction lockbox is the first physical lockbox when the transaction identification is a withdrawal and wherein the physical transaction lockbox is the second physical lockbox when the transaction identification is a deposit;
  - configure the physical transaction lockbox based on the transaction identification, wherein configuring the physical transaction lockbox comprises operating a locking mechanism to physically lock the physical transaction lockbox; and
  - transmit transaction information to the user device, wherein the transaction information includes a lockbox location, lockbox unlock information, and a lockbox number, the lockbox number being the physical transaction lockbox from the plurality of physical lockboxes, the lockbox unlock information being sufficient to unlock the physical transaction lockbox.

9. The computing system of claim 8, wherein the transaction identification is an exchange comprising a transaction deposit amount and a transaction withdrawal amount, wherein the lock request is a first lock request, wherein the physical transaction lockbox is the first physical lockbox, and wherein the lockbox number is a first lockbox number, and wherein the lockbox management circuit is further structured to transmit a second lock request to the second physical lockbox, wherein the second physical lockbox is unlocked when the first physical lockbox receives the transaction deposit amount; and transmitting a second lockbox number, the second lockbox number being the second physical lockbox, wherein the lockbox unlock information is associated with unlocking the first physical lockbox.

10. The computing system of claim 8, wherein the transaction identification is an exchange comprising a transaction deposit amount and a transaction withdrawal amount, wherein the lock request is a first lock request, wherein the physical transaction lockbox is the first physical lockbox, wherein the lockbox number is a first physical lockbox number, and wherein the lockbox management circuit is further structured to transmit a second lock request to the second physical lockbox, wherein the first physical lockbox is unlocked when the transaction withdrawal amount is removed from the second physical lockbox; and transmitting a second lockbox number, the second lockbox number being the second physical lockbox, wherein the lockbox unlock information is associated with unlocking the second physical lockbox.

11. The computing system of claim 8, wherein the transaction identification is an exchange comprising a transaction deposit amount and a transaction withdrawal amount, wherein the lock request is a first lock request, wherein the physical transaction lockbox is the first physical lockbox, wherein the lockbox unlock information is a first lockbox unlock information, wherein the lockbox number is a first lockbox number, and wherein the lockbox management circuit is further structured to transmit a second lock request to the second physical lockbox; and transmit a second lockbox location, second lockbox unlock information, and a second lockbox number to the user device, the second lockbox number being the second physical lockbox from the plurality of physical lockboxes, and the second lockbox unlock information is associated with unlocking the first physical lockbox.

12. The computing system of claim 8, wherein the transaction identification is the withdrawal and the physical transaction lockbox is the first physical lockbox, and wherein the lockbox management circuit is further structured to receive, from a mobile device, an unlock attempt;
- authenticate the unlock attempt, wherein authentication occurs by comparing the unlock attempt to the lockbox unlock information; and
- transmit an unlock command to the first physical lockbox based on the authentication, wherein unlocking the first physical lockbox provides the withdrawal amount of currency.

13. The computing system of claim 8, wherein the transaction identification is the deposit and the physical transaction lockbox is the second physical lockbox, and wherein the lockbox management circuit is further structured to receive, from a mobile device, an unlock attempt;
- authenticate the unlock attempt, wherein authentication occurs by comparing the unlock attempt to the lockbox unlock information; and
- transmit an unlock command to the second physical lockbox based on the authentication, wherein unlocking the second physical lockbox facilitates depositing the deposit amount of currency.

14. The computing system of claim 8, wherein the lockbox management circuit is further structured to:
- transmit a potential lockbox location to the user device, after identifying the physical transaction lockbox from the plurality of physical lockboxes, and
- receive approval of the potential lockbox location from the user device, wherein the potential lockbox location is the lockbox location of the transaction information.

15. A method comprising:
- receiving, by a provider computing system of a provider, a lockbox transaction order from a user device associated with an account holder of the provider, the lockbox transaction order including a transaction identification, pickup device identifier, a transaction location, and a transaction time;
- identifying, by the provider computing system, a physical lockbox associated with the provider from a plurality of physical lockboxes based on the transaction identification and the transaction location, the plurality of physical lockboxes comprising a first physical lockbox configured to dispense a withdrawal amount of currency and a second physical lockbox configured to receive a deposit amount of currency and configured to identify a currency type and currency number of the deposit amount of currency;

transmitting, by the provider computing system, a lock request to the physical lockbox, wherein the physical lockbox is the first physical lockbox when the transaction identification is a withdrawal and wherein the physical lockbox is the second physical lockbox when the transaction identification is a deposit, the lock request including the transaction identification, an identifier associated with the physical lockbox, and the pickup device identifier; and configuring, by the provider computing system, the physical lockbox associated with the identifier based on the transaction identification, wherein configuring the physical lockbox comprises operating a locking mechanism to physically lock the physical lockbox, wherein the physical lockbox is accessible by a user device associated with the pickup device identifier during a transaction time range, the transaction time range associated with the transaction time.

16. The method of claim 15, further comprising:
transmitting, by the provider computing system, the lock request to a provider branch computing device, the provider branch computing device associated with an employee at the provider, wherein the employee at the provider is authorized to complete transactions of the transaction identification of the lockbox transaction order, and wherein the employee will prepare the physical lockbox prior to the transaction time range and will cancel the transaction when past the transaction time range.

17. The method of claim 15, further comprising:
transmitting, after identifying the physical lockbox from the plurality of physical lockboxes by the provider computing system, a potential lockbox location and a potential transaction time range to the user device, and
receiving, by the provider computing system, approval of the potential lockbox location and approval of the potential transaction time range from the user device, wherein the potential transaction time range is the transaction time range.

18. The method of claim 15, wherein the transaction identification is a currency exchange and the transaction identification includes a first amount of a first currency type and a second amount of a second currency type, the second amount of the second currency type being what the account holder must provide to acquire the first amount of the first currency type, further comprising:
transmitting, by the provider computing system, an exchange service call to the physical lockbox, the exchange service call including instructions to an employee at the physical lockbox to ready the first amount of the first currency type.

19. The method of claim 15, wherein the physical lockbox is unlockable by a NFC, bar code, QR code, or proximity based communication between the user device and the physical lockbox.

20. The method of claim 15, further comprising:
generating, by the provider computing system, a transaction details summary, the transaction details summary providing information related to completion of the lockbox transaction order; and
transmitting, by the provider computing system, the transaction details summary to the user device.

* * * * *